(12) United States Patent
McLaughlin et al.

(10) Patent No.: US 9,378,470 B2
(45) Date of Patent: Jun. 28, 2016

(54) SYSTEMS AND METHODS FOR IMPROVED ACCESS TO AN ATTRACTION

(75) Inventors: Kevin McLaughlin, Charlestown, MA (US); Cecilia Dahl, Scituate, MA (US); Rob Cartwright, Norwell, MA (US); Matt Higgins, Holden, MA (US)

(73) Assignee: Smart Destinations, Inc., Boston, MA (US)

( * ) Notice: Subject to any disclaimer, the term of this patent is extended or adjusted under 35 U.S.C. 154(b) by 485 days.

(21) Appl. No.: 13/523,243

(22) Filed: Jun. 14, 2012

(65) Prior Publication Data

US 2012/0324542 A1 Dec. 20, 2012

Related U.S. Application Data

(60) Provisional application No. 61/497,388, filed on Jun. 15, 2011.

(51) Int. Cl.
| | |
|---|---|
| *G06Q 10/02* | (2012.01) |
| *G06Q 20/32* | (2012.01) |
| *G06Q 30/00* | (2012.01) |
| *G07C 9/00* | (2006.01) |
| *G06Q 20/12* | (2012.01) |
| *G06Q 20/16* | (2012.01) |
| *G06Q 30/06* | (2012.01) |

(52) U.S. Cl.
CPC ............ *G06Q 10/02* (2013.01); *G06Q 20/3276* (2013.01); *G06Q 30/00* (2013.01); *G07C 9/00007* (2013.01); *G06Q 20/12* (2013.01); *G06Q 20/16* (2013.01); *G06Q 30/0635* (2013.01)

(58) Field of Classification Search
CPC ...................................................... H04L 63/10
USPC ........................................................ 726/2, 4
See application file for complete search history.

(56) References Cited

U.S. PATENT DOCUMENTS

| | | | |
|---|---|---|---|
| 6,889,098 B1 | 5/2005 | Laval et al. | |
| 2002/0091568 A1 | 7/2002 | Kraft et al. | |
| 2002/0116235 A1 | 8/2002 | Grimm et al. | |
| 2003/0225630 A1* | 12/2003 | Kakuta | ............................ 705/26 |
| 2004/0158482 A1 | 8/2004 | Hale et al. | |
| 2004/0181438 A1* | 9/2004 | Hoene et al. | ....................... 705/5 |
| 2004/0220821 A1 | 11/2004 | Ericsson et al. | |
| 2006/0031178 A1 | 2/2006 | Lehrman et al. | |

(Continued)

OTHER PUBLICATIONS

ShutterStock—Tickets. Mar. 15, 2011. Obtained from Way Back Machine on Feb. 22, 2015. https://web.archive.org/web/20110315072705/http://www.shutterstock.com/s/tickets/search.html.*

(Continued)

*Primary Examiner* — Robert Leung
*Assistant Examiner* — Ngoc D Nguyen
(74) *Attorney, Agent, or Firm* — Christopher J. McKenna; Foley & Lardner LLP

(57) ABSTRACT

The present invention is directed towards systems and methods for improved access to an attraction via a computing device of a user. A first computing device of a user records an identification code associated with an attraction. The first computing device transmits, to a second computing device, a request for access to the attraction, the request comprising the identification code. The first computing device receives, from the second computing device, an access authorization comprising an access code. The first computing device presents the access code to an attraction operator for access to the attraction.

20 Claims, 26 Drawing Sheets

(56) References Cited

U.S. PATENT DOCUMENTS

| | | |
|---|---|---|
| 2007/0203763 A1 | 8/2007 | Ackley et al. |
| 2007/0282667 A1 | 12/2007 | Cereghini et al. |
| 2008/0270280 A1 | 10/2008 | Major et al. |
| 2009/0233584 A1 | 9/2009 | Watson et al. |
| 2009/0288159 A1* | 11/2009 | Husemann et al. ............ 726/16 |
| 2009/0292599 A1 | 11/2009 | Rampell et al. |
| 2009/0307154 A1 | 12/2009 | Carter, III |
| 2010/0106587 A1 | 4/2010 | Walker et al. |
| 2010/0106602 A1 | 4/2010 | Fuzell-Casey et al. |
| 2010/0190510 A1* | 7/2010 | Maranhas et al. ......... 455/456.1 |
| 2010/0211431 A1 | 8/2010 | Lutnick et al. |
| 2011/0040655 A1 | 2/2011 | Hendrickson |
| 2011/0082759 A1 | 4/2011 | Swinson et al. |
| 2011/0137742 A1* | 6/2011 | Parikh .......................... 705/26.1 |
| 2012/0290383 A1 | 11/2012 | Busch |
| 2013/0159077 A1* | 6/2013 | Stringfellow et al. ..... 705/14.16 |

OTHER PUBLICATIONS

International Search Report and Written Opinion issued Oct. 16, 2012 in PCT Application No. PCT/US2012/32597.
US Notice of Allowance for U.S. Appl. No. 13/085,005 dated Feb. 24, 2014.
US Office Action for U.S. Appl. No. 13/085,005 dated Nov. 21, 2013.
US Office Action for U.S. Appl. No. 13/085,005 dated Jun. 20, 2012.
US Office Action for U.S. Appl. No. 13/085,005 dated Jul. 22, 2013.
US Office Action for U.S. Appl. No. 13/523,213 dated Jul. 23, 2014.
International Search Report and Written Opinion issued Dec. 18, 2012 in PCT Application No. PCT/US2012/042488.
US Notice of Allowance on U.S. Appl. No. 14/341,219 DTD Mar. 30, 2015.
US Office Action for U.S. Appl. No. 13/523,213 dated Jan. 8, 2015.
US Office Action for U.S. Appl. No. 14/341,219 dated Nov. 4, 2014.
US Office Action on U.S. Appl. No. 13/523,213 mailed Oct. 22, 2015.

* cited by examiner

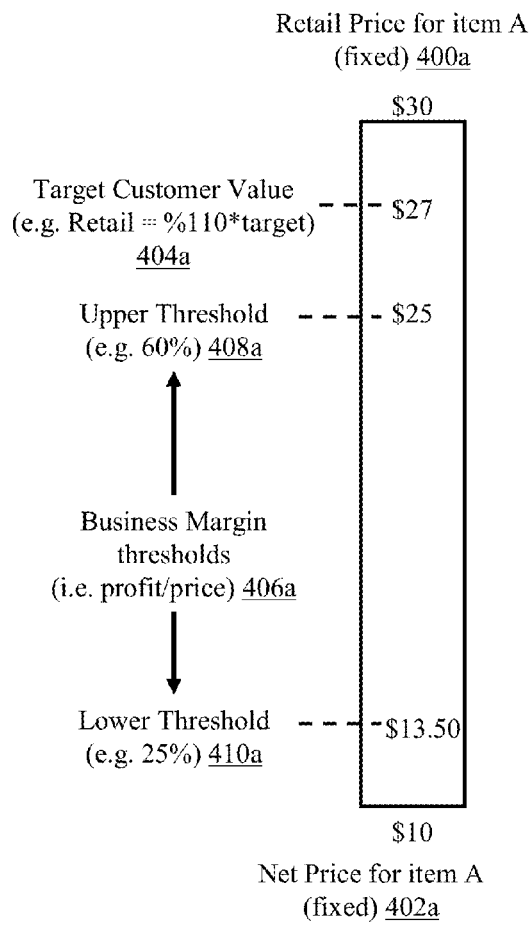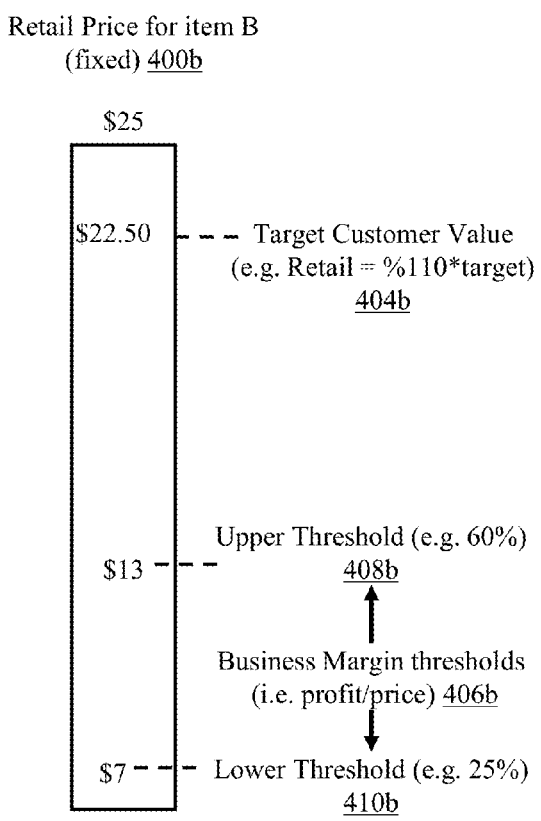
*FIG. 4A*
*FIG. 4B*

SYSTEMS AND METHODS FOR IMPROVED ACCESS TO AN ATTRACTION

RELATED APPLICATIONS

The present application claims priority to and the benefit of U.S. Provisional Patent Application No. 61/497,388, entitled "Systems and Methods for Next Generation Enhanced Attraction Access," filed Jun. 15, 2011, the entirety of which is hereby incorporated by reference.

FIELD OF THE INVENTION

The present application generally relates to access systems. In particular, the present application relates to systems and methods for providing improved purchase of and access to attractions.

BACKGROUND OF THE INVENTION

Items, whether tangible or intangible goods, or access to attractions, events, venues, or other services, may be priced by a vendor, agent, broker or retailer based on a cost or expense and a desired profit margin or markup. At the expense of profit, discounts may be provided to purchasers of the items, typically to encourage greater demand. Typically, these discounts are applied as a flat percentage across all items. This is practical, because the profit margin is typically also applied as a flat percentage. For example, regardless of each individual item's cost, if a vendor prices different items with a 50% markup, the vendor can then grant a 10% discount without fear that the discounted price will be less than cost.

However, particularly where a broker or agent is selling items from multiple vendors, each item may have a different markup, determined by a net price the broker or agent has to pay to the vendor when each item is sold and a retail price set by the vendor. For example, a first item may have an 80% markup, while a second item may have a 20% markup. Because the items may have wildly different net and retail prices, the cash value of the markups may be unpredictable. For example, a large markup on an inexpensive item may be negligible compared to a small markup on a very expensive item.

Accordingly, a non-intelligent system that applies the same discount across all items may result in some items being priced below cost or below a desired profit margin. As a result, retailers using such non-intelligent systems may not be able to balance customer discounts against desired business goals or margins. Conversely, in some instances, a discount applied across items with widely different costs and retail prices may result in a sale price that represents only a negligible discount for the customer and greater profits than are required by the retailer. However, without an intelligent system able to balance these costs and prices, additional price reductions cannot be easily passed on to the customer.

BRIEF SUMMARY OF THE INVENTION

The present application is directed towards systems and methods for providing ticketing and access to attractions, and enhanced analysis and reporting of customer actions. In one aspect, the present application is directed toward systems and methods for providing enhanced location-based customer tracking, pathing, and reporting for targeted advertising and upselling opportunities, and improved marketing. In another aspect, the present application is directed towards systems and methods for providing a rewards-based attraction access purchase model. In still another aspect, the present application is directed towards a "virtual" ticket purchase and access system that utilizes customers' and attraction operators' own computing devices, reducing the need for system infrastructure.

In one aspect, the present application is directed to a method for enhanced marketing responsive to customer path data between attractions. The method includes receiving, by a first device, an identification of a location of a user and a first attraction selected for access by a user. The method further includes determining, by a path analysis module, a travel path between the location of the user and the first attraction. The method also includes identifying, by the path analysis module, a second attraction within a predetermined distance from the travel path. The method also includes transmitting, by the first device to a computing device of the user, an offer of access to the second attraction.

In one embodiment, the method includes receiving an identification of a third attraction accessed by the user. In another embodiment, the method includes determining a travel path between the third attraction and the first attraction. In still another embodiment of the method, transmitting the offer of access to the second attraction is performed responsive to receiving an indication of access by the user to the third attraction.

In some embodiments, the method includes identifying the second attraction based on a net price associated with the second attraction being below a net price threshold. In other embodiments, the method includes identifying the second attraction based on an average customer visit time of the second attraction being above a visit time threshold. In a further embodiment of the method, the visit time threshold comprises a time until expiration of an access ticket of the user for first second attraction.

In one embodiment, the method includes transmitting an offer to add the second attraction to a previously-purchased access ticket of the user. In another embodiment, the method includes receiving the identification of the location of the user; transmitting an offer of access to the first attraction to the computing device of the user; and receiving a selection of the first attraction by the user.

In another aspect, the present application is directed to a system for enhanced marketing responsive to customer path data between attractions. The system includes a first device comprising a receiver, a path analyzer, and a transmitter. The receiver is configured for receiving an identification of a location of a user and a first attraction selected for access by a user. The path analyzer is configured for a path analyzer for determining a travel path between the location of the user and the first attraction, and identifying a second attraction within a predetermined distance from the travel path. The transmitter is configured for transmitting, to a computing device of the user, an offer of access to the second attraction.

In one embodiment of the system, the receiver is further configured for receiving an identification of a third attraction accessed by the user. In another embodiment of the system, the path analyzer is further configured for determining a travel path between the third attraction and the first attraction. In still another embodiment of the system, the transmitter is further configured for transmitting the offer of access to the second attraction responsive to the receiver receiving an indication of access by the user to the third attraction.

In some embodiments of the system, the path analyzer is further configured for identifying the second attraction based on a net price associated with the second attraction being below a net price threshold. In other embodiments of the system, the path analyzer is further configured for identifying the second attraction based on an average customer visit time of the second attraction being above a visit time threshold. In a further embodiment of the system, the visit time threshold comprises a time until expiration of an access ticket of the user for first second attraction.

In one embodiment of the system, the transmitter is further configured for transmitting an offer to add the second attraction to a previously-purchased access ticket of the user. In another embodiment of the system, the transmitter is further configured for transmitting an offer of access to the first attraction to the computing device of the user, responsive to the receiver receiving the identification of the location of the user; and the receiver is further configured for receiving a selection of the first attraction responsive to transmission of the offer of access to the first attraction.

In another aspect, the present application is directed to a method for automatically generating a media collection representing a user's visit to an attraction. The method includes identifying, by a record generator of a computing device, an attraction accessed by a user, a user arrival time at the attraction, and a user departure time at the attraction. The method further includes determining, by the record generator, that a first item of media recorded by the user was recorded at a time between the user arrival time and user departure time. The method also includes modifying the first item of media, by the record generator, to include an identification of the attraction. The method further includes generating, by the record generator, a user media collection including the first item of media, responsive to the first item of media including the identification of the attraction.

In one embodiment, the method includes retrieving, by the record generator from a media database, a second item of media including the identification of the attraction, the second item of media not recorded by the user; and storing the second item of media, by the record generator, to the user media collection.

In yet another aspect, the present application is directed to a method for improved access to an attraction via a computing device of a user. The method includes recording, by a first computing device of a user, responsive to a command of the user, an identification code associated with an attraction. The method also includes transmitting, by the first computing device to a second computing device of a dynamic pricing system operator, a request for access to the attraction, the request comprising the identification code. The method further includes receiving, by the first computing device from the second computing device, an access authorization comprising an access code. The method also includes presenting, by the first computing device, the access code to an attraction operator for access to the attraction.

In one embodiment, the method includes capturing an image of the identification code with a camera of the first computing device. In another embodiment, the method includes inputting an identification code, by the user. In yet another embodiment, the method includes recording a wirelessly transmitted code from a third computing device. In some embodiments, the method includes transmitting an identification of the user. In other embodiments, the method includes receiving an access authorization responsive to successful billing of the user to a payment system.

In one embodiment of the method, receiving the access authorization further includes receiving an image. In a further embodiment of the method, receiving the access authorization further comprises receiving a quick-response (QR) code. In another embodiment, the method includes receiving, by the first computing device from the second computing device, an offer to purchase an access ticket to the attraction; receiving, by the first computing device, a selection of the user to accept the offer; and transmitting, by the first computing device to the second computing device, a response accepting the offer. In still another embodiment, the method includes presenting the access code for scanning by a fourth computing device of the attraction operator.

In yet another aspect, the present application is directed to a system for improved access to an attraction via a computing device of a user. The system includes a first computing device of a user, configured with an input device, a network interface, and a display. The input device is configured for recording, responsive to a command of the user, an identification code associated with an attraction. The network interface is configured for transmitting, to a second computing device of a dynamic pricing system operator, a request for access to the attraction, the request comprising the identification code, and receiving, from the second computing device, an access authorization comprising an access code. The display is configured for presenting the access code to an attraction operator for access to the attraction.

In one embodiment of the system, the input device comprises a camera and is configured for capturing an image of the identification code. In another embodiment of the system, the input device is configured for receiving an identification code input by the user. In yet another embodiment of the system, the input device records a wirelessly transmitted code from a third computing device. In yet still another embodiment of the system, the network interface transmits an identification of the user to the second computing device.

In some embodiments of the system, the network interface receives an access authorization responsive to successful billing of the user to a payment system. In other embodiments of the system, the network interface receives the access authorization comprising an image. In a further embodiment of the system, the network interface receives the access authorization comprising a quick-response (QR) code.

In one embodiment of the system, the network interface receives, from the second computing device, an offer to purchase an access ticket to the attraction; and transmits, to the second computing device, a response accepting the offer, responsive to a user selection. In another embodiment of the system, the display presents the access code for scanning by a fourth computing device of the attraction operator.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 4A-4D are pricing diagrams of example embodiments of retail prices and net prices, illustrating determination of business margins;

Figure 1A:
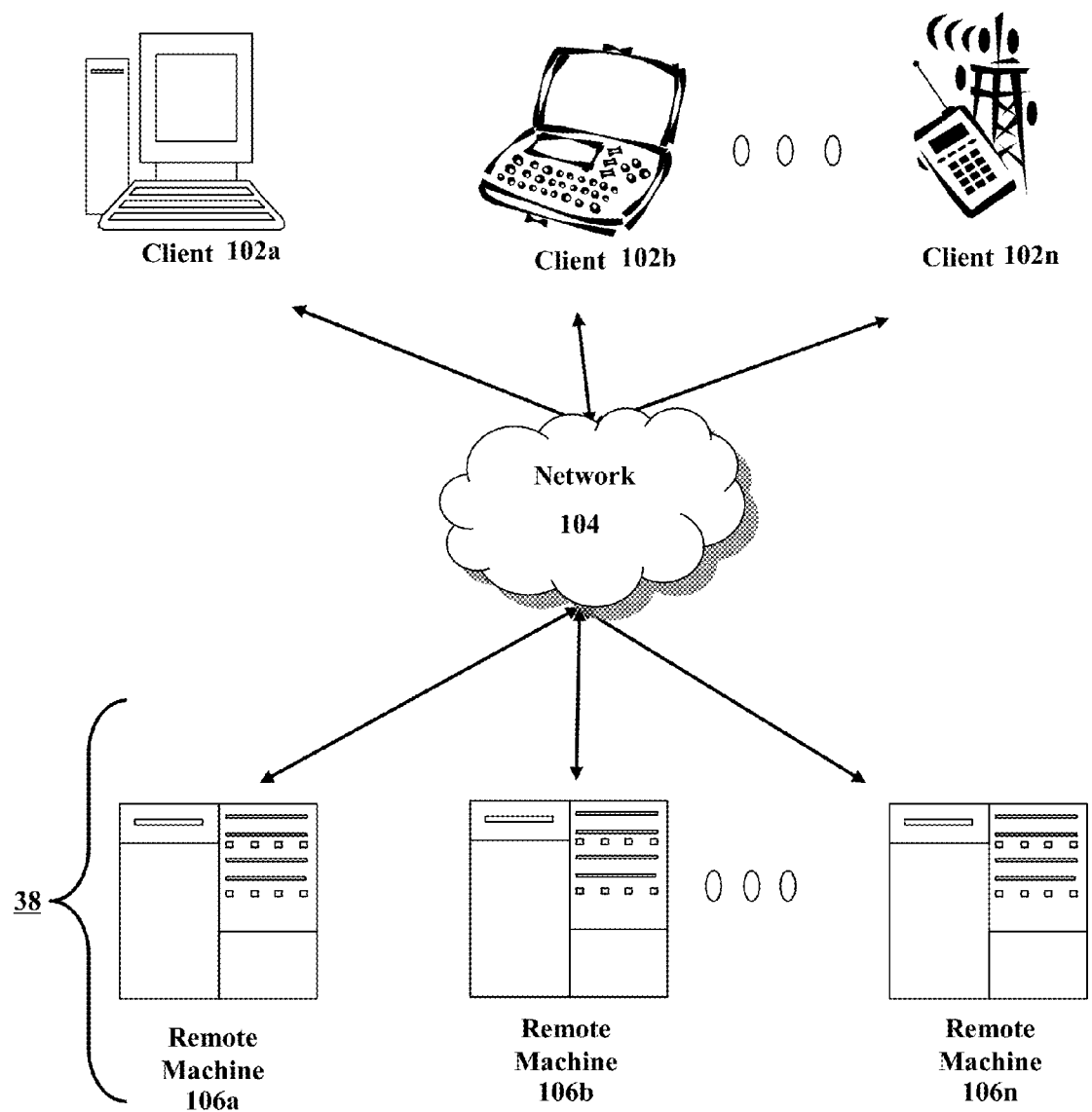
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes systems and methods for dynamic pricing of items, goods, services, or tickets to attractions or events;

Section C describes systems and methods for selling and validating access tickets or tokens;

Section D describes systems and methods for dynamically pricing an extended order or offer for goods, services, events and other items;

Section E describes systems and methods for providing enhanced data collection and reporting for improved ticket pricing and marketing;

Section F describes systems and methods for rewards-based models for ticket pricing and marketing; and Section G describes systems and methods for improved ticket purchase and access.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment includes one or more clients 102a-102n (also generally referred to as local machine(s) 102, node(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node 102 seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38 or a machine farm 38. In another of these embodiments, the remote machines 106 may be geographically dispersed. In other embodiments, a server farm 38 may be administered as a single entity. In still other embodiments, the server farm 38 includes a plurality of server farms 38. The remote machines 106 within each server farm 38 can be heterogeneous—one or more of the remote machines 106 or machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

In one embodiment, remote machines 106 in the server farm 38 may be stored in high-density rack systems, along with associated storage systems, and located in an enterprise data center. In this embodiment, consolidating the remote machines 106 in this way may improve system manageability, data security, the physical security of the system, and system performance by locating remote machines 106 and high performance storage systems on localized high performance networks. Centralizing the remote machines 106 and storage systems and coupling them with advanced system management tools allows more efficient use of server resources.

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection. Additionally, a heterogeneous server farm 38 may include one or more remote machines 106 operating according to a type of operating system, while one or more other remote machines 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif., the Xen hypervisor, an open source product whose development is overseen by Citrix Systems, Inc., the VirtualServer or virtual PC hypervisors provided by Microsoft, or others.

Remote machine 106 may be a file server, application server, web server, proxy server, appliance, network appliance, gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
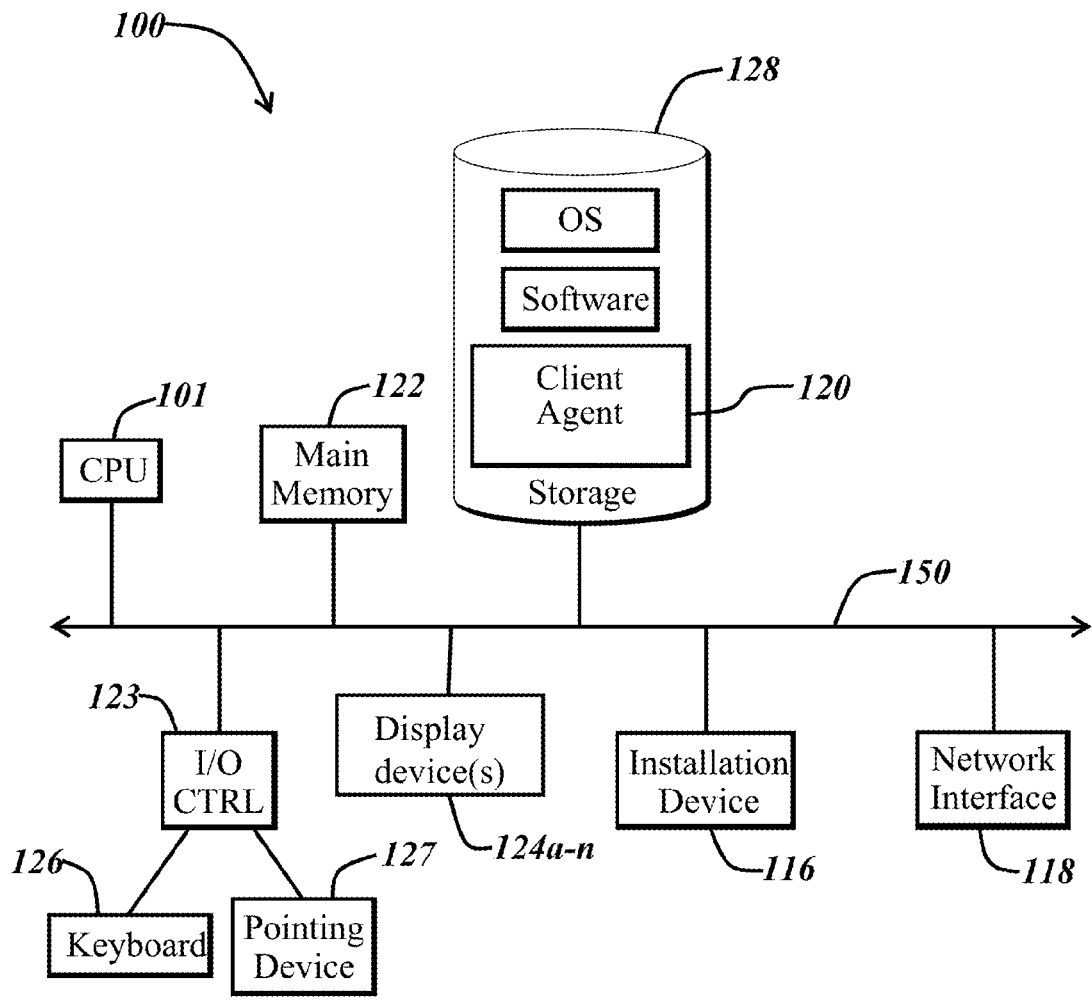
FIGS. 1B-1C are block diagrams depicting embodiments of computers useful in connection with the methods and systems described herein.
Figure 1C:
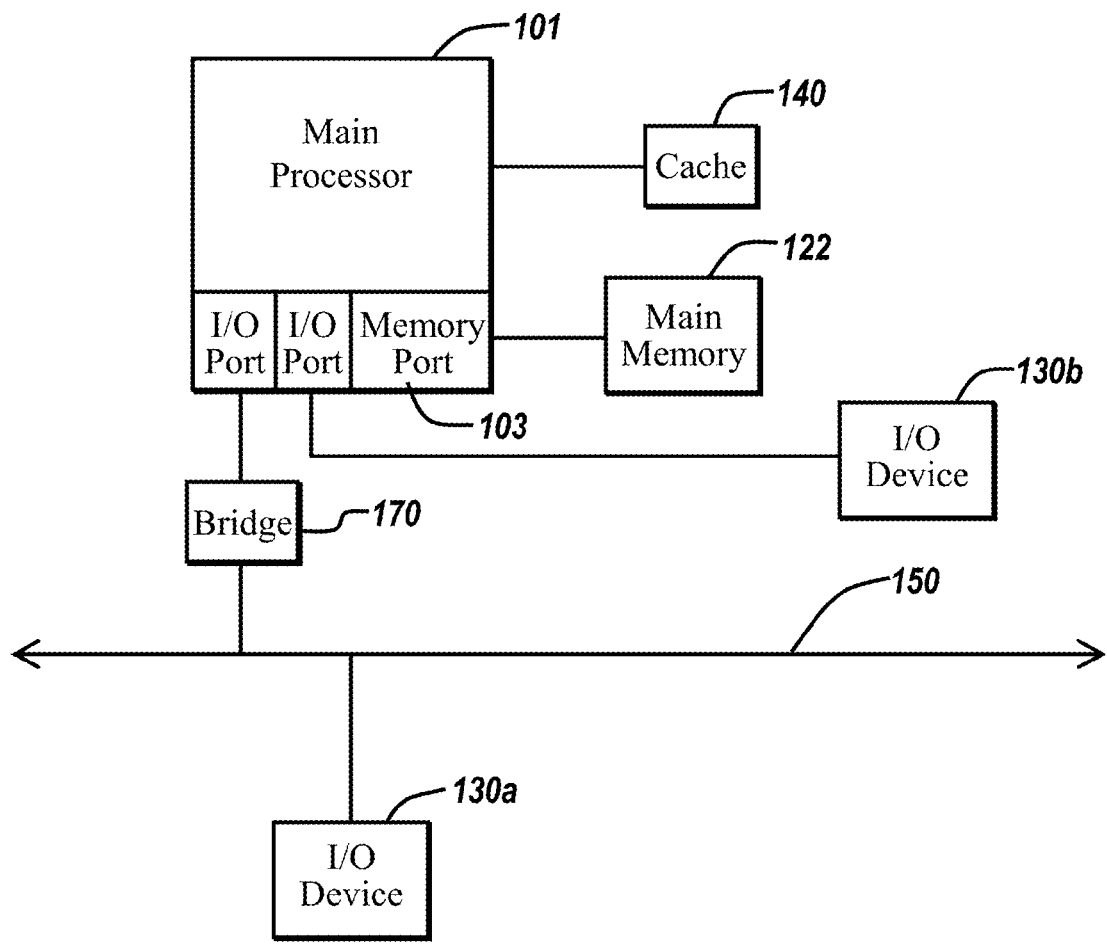

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD, IPAD, or IPHONE families of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95c1, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a Smartphone, for example, an IPHONE manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

B. Systems and Methods for Dynamic Pricing of Goods, Services, or Tickets to Attractions or Events Before discussing specifics of an improved system for dynamically pricing goods, services, events, attractions, and other items, it may be helpful to provide definitions and examples of a few terms as used herein:

Inventory Items: inventory items, or just items, in some embodiments, may refer to goods, such as clothing, books, ebooks, software, household goods, toys, electronic equipment, coupons, gift certificates, or any other type and form of tangible or intangible goods; services or tokens or tickets for services, such as bus, train, or airline travel, hotel reservations, repair services, legal services, time utilizing or access to a cloud computing service or application, credits for online networks or multiplayer games, or any other type and form of service or access ticket or token for a service; tickets to attractions, such as museums, parks, tours, cruises, fairs, amusement or theme parks, lift tickets for ski resorts, beaches with paid admission, or any other type and form of attraction; or tickets to events, such as theater tickets, movie tickets, concert tickets, lectures, classes, or any other type and form of event. In some embodiments, an item may overlap multiple categories, such as a reservation for a restaurant wine tasting event, a combination tour and travel bus, or a combined lift ticket, ski rental, and lesson. The dynamic pricing and validation systems and methods discussed herein may be readily applied to items from any subcategory or combination of subcategories. Accordingly, these items may be referred to variously as items, inventory items, goods, services, attractions, or events, without limiting any embodiment to exclusively applying to a subcategory.

Destinations: a destination may refer to a geographic area that consumers may travel to. A destination may refer to a city, such as Boston or Toronto; a region, such as Wine Country, Calif., or the Loire Valley of France; a park or collection of parks, such as the theme parks and attractions of the Walt Disney World Resort in Orange County, Florida; a resort, such as the Mount Snow ski area in Vermont; an island, such as Bermuda or St. Martin; or any other potential travel destination. In some embodiments, a destination may refer to a route, such as a multi-island trip via a cruise ship.

Attraction or Event Destination: in some embodiments, attractions or events may be grouped based on destination. For example, multiple theater shows and/or museums in a single city may be grouped. In other embodiments, an attraction may belong to multiple destinations.

Retail Price: a retail price may refer to a price that a consumer would pay if purchasing the item from the manufacturer, operator, or original provider directly. For example, a retail price of a good may refer to a manufacturer suggested retail price (MSRP). Similarly, a retail price of a ticket for an attraction or event may refer to a face value of the ticket, such as a concert ticket face value or admission ticket face value. In some embodiments, the retail price may be referred to as a default price. In one embodiment, the retail price may be zero.

In some embodiments in which the item is an admission ticket to an event or attraction, there may be multiple retail prices for the admission ticket, such as an adult admission retail price, a child admission retail price, a student admission retail price, a veteran admission retail price, a disabled admission retail price, or any other type of classification of the admission ticket. In similar embodiments, the admission may have different retail prices based on location of seat within a venue. In other embodiments, such as where the item is an airline travel ticket, the item may have different retail prices based on class, such as first class, business class, or economy class. In still other embodiments, such as where the item is an item of clothing, the item may have different retail prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single retail price.

In some embodiments, an attraction may have retail prices that may change over time, such as a seasonal change based on differences in demand at different times of year. In a further embodiment, an attraction may have a non-date specific retail price. In one embodiment, this non-date specific retail price may represent a default price, with seasonal variations applied as discounts or increases to the default price.

Additionally, as discussed shortly below, in some embodiments, a retail price may refer to two separate prices. In embodiments using a minimal volume type, a first item may have a first retail price used when the number of items in an order is below said first item's minimal volume type value, and may have a second retail price used when the number of items in the order is equal to or greater than said first item's minimal volume type value. In one embodiment, the second retail price may comprise the first retail price, minus a target customer value discount. In many embodiments, the first retail price may be predetermined by a vendor when establishing a contract, discussed in more detail below. Accordingly, the predetermined retail price may therefore equal the first retail price, and be proportional to the second retail price. For clarity, except when the distinction is specifically important, both of these prices may be referred to as the retail price.

Net Price: a net price may refer to a price that the dynamic pricing system operator agrees to pay to an item provider, such as a venue, attraction partner, manufacturer, wholesaler, or other source of items in exchange for the item provider providing the item to a purchaser. In some embodiments, payment may be due when the order is fulfilled, while in other embodiments, payment may be due at a future date, such as within 30 days, 60 days, 90 days, or any other agreed payment schedule. In embodiments in which the item is a good, an order may be fulfilled by delivery of the item, while in embodiments in which the item is an admission ticket, the order may be fulfilled when the purchaser of the ticket or customer visits the attraction or attends the event. In other embodiments in which the item is a service or access to a service, such as a cloud computing service, the order may be fulfilled when the purchaser or consumer utilizes or accesses the service. In embodiments in which payment is made to the provider at a future time, the net price may be determined or fixed at the time the order is fulfilled. For example, in one embodiment, the net price may be based on the time of access to an attraction and may be undetermined when a consumer purchases the ticket. When the user uses the ticket to access the attraction, the net price due to the attraction operator may be determined based on that time, even if payment is not provided immediately.

The net price is frequently lower than the retail price for an item, although in some embodiments, they may be the same or the net price may be higher. For example, in one embodiment, a retail price for an admission ticket to a concert may be $100, while the net price to be paid to the concert operator may be $70. Accordingly, if the dynamic pricing system operator sells the admission ticket at a sale price of $80, the consumer may save $20 off the retail price while the dynamic pricing system operator makes $10 in profit (although this may be further reduced due to transaction charges, handling charges, taxes, or other similar reductions). In some embodiments, the net price may be referred to as a provider invoice price. In one embodiment, the net price may be zero.

In some embodiments in which the item is an admission ticket to an event or attraction, there may be multiple net prices for the admission ticket, such as an adult admission net price, a child admission net price, a student admission net price, a veteran admission net price, a disabled admission net price, or any other type of classification of the admission ticket. In similar embodiments, the admission may have different net prices based on location of seat within a venue. In other embodiments, such as where the item is an airline travel ticket, the item may have different net prices based on class, such as first class, business class, or economy class. In still other embodiments, such as where the item is an item of clothing, the item may have different net prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single net price.

In some embodiments, an attraction may have net prices that may change over time, such as a seasonal change based on differences in demand at different times of year. In a further embodiment, an attraction may have a non-date specific net price. In one embodiment, this non-date specific net price may represent a default price, with seasonal variations applied as discounts or increases to the default price. In many embodiments, variations in the net price correspond to variations in the retail price of the item.

Sale Price: a sale price may refer to a price charged to a consumer for an item, access ticket or token, admission ticket, inventory item, or other product or service. In many embodiments, the sale price may be determined dynamically by the dynamic pricing system. In some embodiments, the sale price may be referred to as a discounted price or a customer invoice price. In many embodiments, the sale price is less than or equal to the retail price. In one embodiment, the sale price may be zero.

In some embodiments in which the item is an admission ticket to an event or attraction, there may be multiple sale prices for the admission ticket, such as an adult admission sale price, a child admission sale price, a student admission sale price, a veteran admission sale price, a disabled admission sale price, or any other type of classification of the admission ticket. In similar embodiments, the admission may have different sale prices based on location of seat within a venue. In other embodiments, such as where the item is an airline travel ticket, the item may have different sale prices based on class, such as first class, business class, or economy class. In still other embodiments, such as where the item is an item of clothing, the item may have different sale prices based on size, such as a higher price for an extra-large size as opposed to a small size. However, in other embodiments, these different admissions, tickets, goods, or other items may be considered separate items. For example, in one embodiment, an adult admission ticket may be considered a separate item from a child admission ticket, and therefore each item may have just a single sale price.

In some embodiments, an attraction may have sale prices that may change over time, such as a seasonal change based on differences in demand at different times of year. In a further embodiment, an attraction may have a non-date specific sale price. In one embodiment, this non-date specific sale price may represent an adjusted or discounted non-date specific retail price. In many embodiments, variations in the sale price correspond to variations in the retail price or net price of the item.

In some embodiments, the sale price may be determined as a dollar amount (or amount in another currency), or as a percentage discount from the retail price. In one embodiment, if the sale price is a percentage value, the dynamic pricing system may determine a dollar amount or other currency amount responsive to the percentage value.

Minimal Volume Type: in some embodiments, a discount may be applied based on a number of items in an order. For example, in one such embodiment, if a consumer orders 2 items, they may receive a 5% discount; if they order 4 items, they may receive a 10% discount; etc. In some embodiments, if the order contains only a single item, no discount may applied, and the sale price may be dynamically set to the retail price of the item. In other embodiments, however, a provider of an item or venue operator may change this behavior, by setting a minimal volume type associated with the good, service, attraction, ticket, or other item. The minimal volume type may comprise a string, flag, or other indicator in a database or other record associated with the item, and may indicate a minimum number of items in the order before a discount may be applied. For example, if the minimal volume type is set to 1, then if the item is the only item in the order, the sale price may be set equal to the retail price or the item may be sold at the retail price. If the order contains more than the minimal volume type number, the sale price of the item may be dynamically determined, including discounts applied. This may be done to encourage consumers to purchase more items, or provide incentives for frequent purchasers. In some embodiments, the minimal volume type for an item may be set to 0. In such a case, even if the item is the only item in the order, the sale price of the item may be dynamically determined.

Customer discount: the customer discount may refer to a percentage discount or savings a consumer receives when purchasing one or more items at their respective sale prices or a combined sale price compared to purchasing the one or more items at their respective retail prices or a combined retail price. In many embodiments, the customer discount may be a default or target customer value, which may be set by the operator of the dynamic pricing system. For example, in one embodiment, the target customer value may be 105%, indicating that the retail price for an item is at least 105% of the dynamically determined sale price for the item. In some embodiments, static customer discounts may be applied to items individually by an operator of the dynamic pricing system. This may be done, for example, for sales or promotions, responsive to up-selling or cross-selling opportunities for consumers who purchase an item, or for other reasons.

Figure 2:
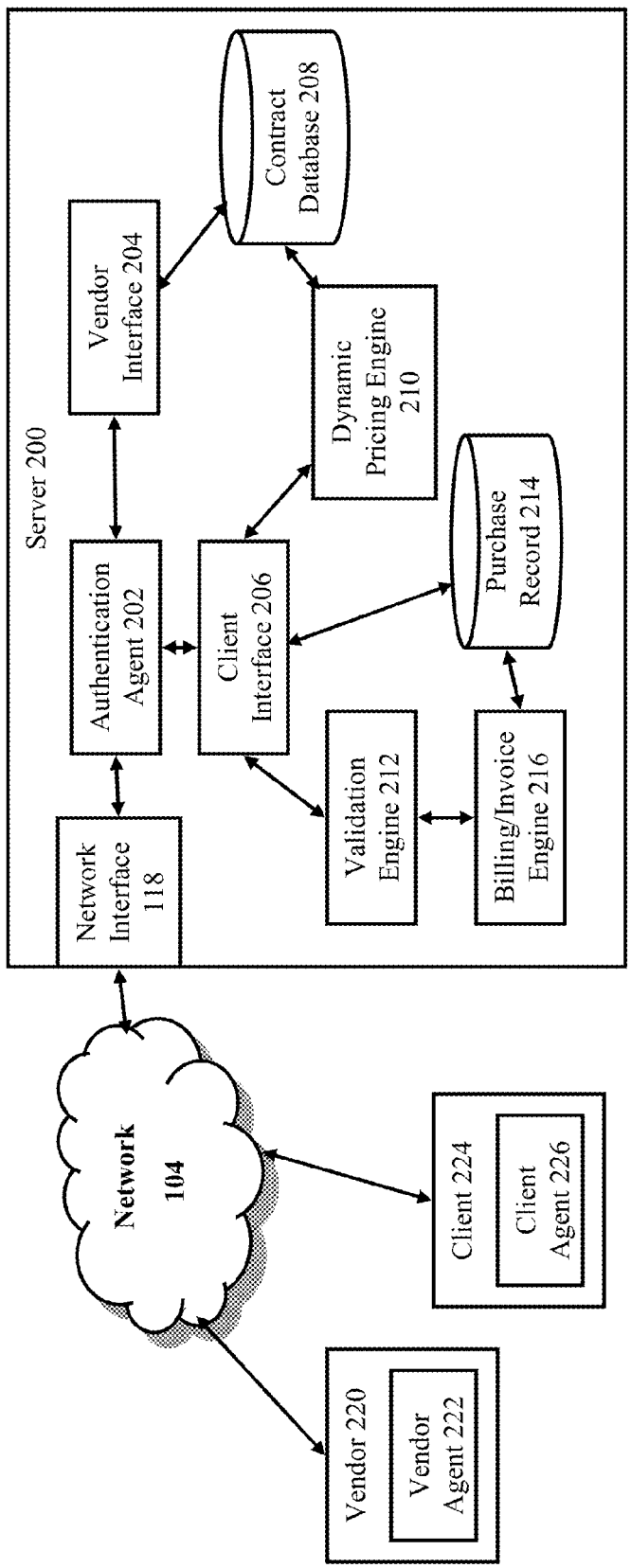
FIG. 2 is a block diagram depicting an embodiment of a system for dynamically pricing and validating access to goods, services, attractions, events and other items.

Referring now to FIG. 2, illustrated is a block diagram depicting an embodiment of a system for dynamically pricing and validating access to goods, services, attractions, events and other items. In brief overview, a server 200 may connect via a network 104 to one or more vendors 220 and/or clients 224. Although referred to as vendors 220 and clients 224, in many embodiments, vendors 220 and clients 224 may comprise computing devices used by vendors and clients, such as desktop computers, smartphones, laptop computers, terminals, or any other type and form of computing device. Similarly, server 200 may comprise any type and form of computing device. Although server 200 is illustrated as a single server, in some embodiments, server 200 may comprise multiple servers, such as a server farm, an application server and a database server, one or more web servers, or other collections of purpose-specific or general servers. In some embodiments, server 200 may comprise one or more servers or virtual servers executed by a cloud service. Although only a single network 104 is illustrated, in many embodiments, multiple networks 104 may be used to connect to one or more vendors 220 or clients 224. In some embodiments, server 200 may comprise a network interface 118 and an authentication agent 202, providing access to a vendor interface 204 and/or a client interface 206. Vendors and administrators may utilize the vendor interface 204 to add or configure contracts for selling items, stored in contract database 208. Server 200 may execute a dynamic pricing engine 210 to dynamically calculate sale prices, discounts, apply business margin verification rules, or perform other functions for allowing a client using client interface 206 to purchase an item. In some embodiments, server 200 may further comprise a validation engine 212, billing or invoice engine 216, and/or a purchase record database 214. In some embodiments, vendor 220 may include a vendor agent 222, and/or client 224 may include a client agent 226.

Still referring to FIG. 2 and in more detail, in some embodiments, a server 200 may comprise or execute an authentication agent 202. Authentication agent 202 may comprise an application, server, service, program, daemon, or other executable code for authenticating a user, client, administrator, or vendor. In some embodiments, authentication agent 202 may comprise a login service or other service to verify the identity and/or credentials of a user. In some embodiments, authentication agent 202 may direct a user to either client interface 206 or vendor interface 204, depending on whether the user is a customer, or a vendor or other provider of items.

Vendor interface 204 may comprise a web service, application, web page, or other interface for allowing a vendor to specify details of an item contract stored in contract database 208. An item contract may comprise an agreement to provide an item of inventory, provide goods or services, allow access to an event or attraction, or otherwise fulfill a customer order. An item contract may include one or more terms that may be configurable by the vendor via vendor interface 204, or an administrator.

Figure 3A:
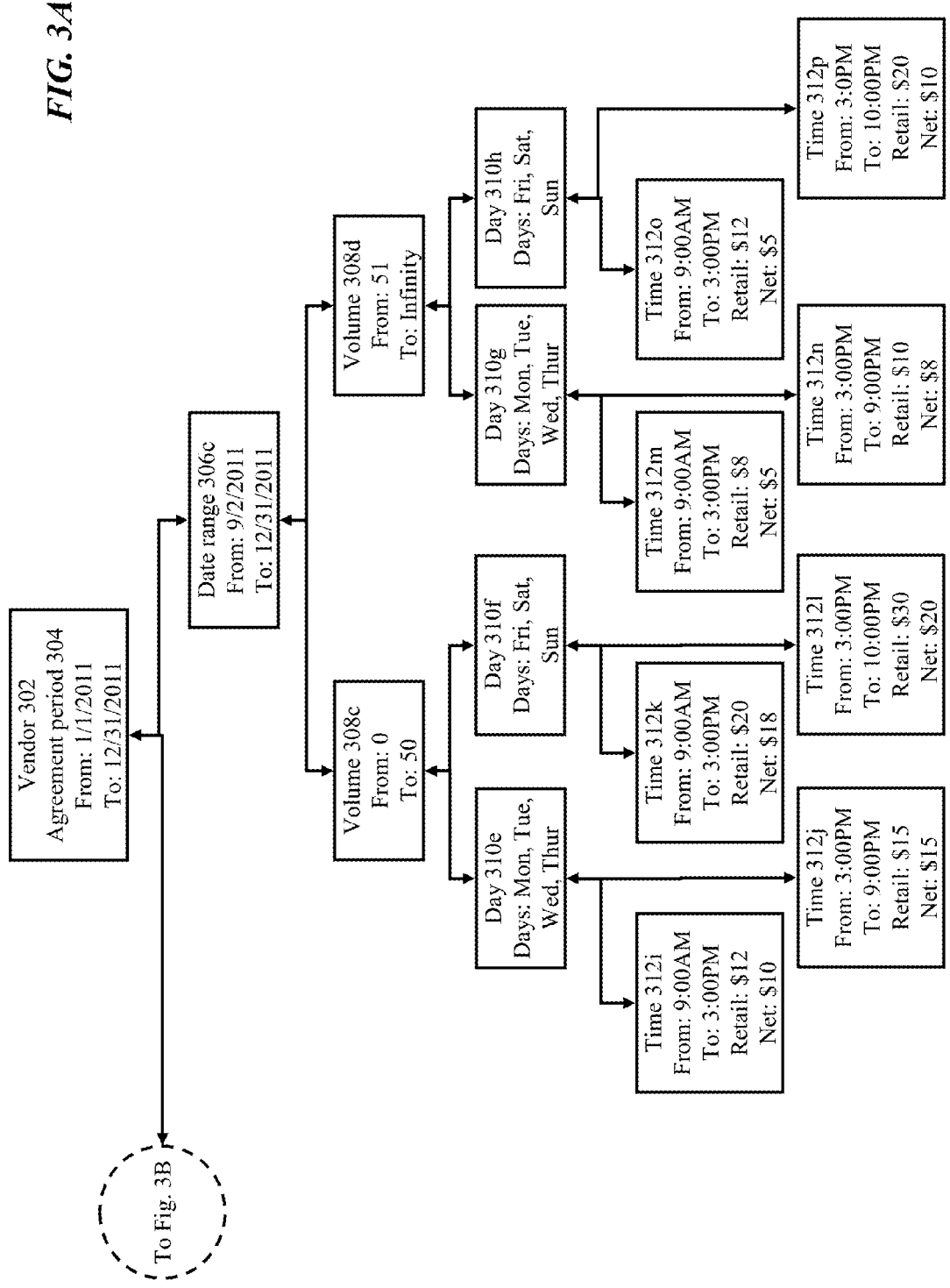
FIGS. 3A and 3B are a block diagram of an embodiment of a hierarchical tree for dynamically pricing goods, services, attractions, events and other items.
Figure 3B:
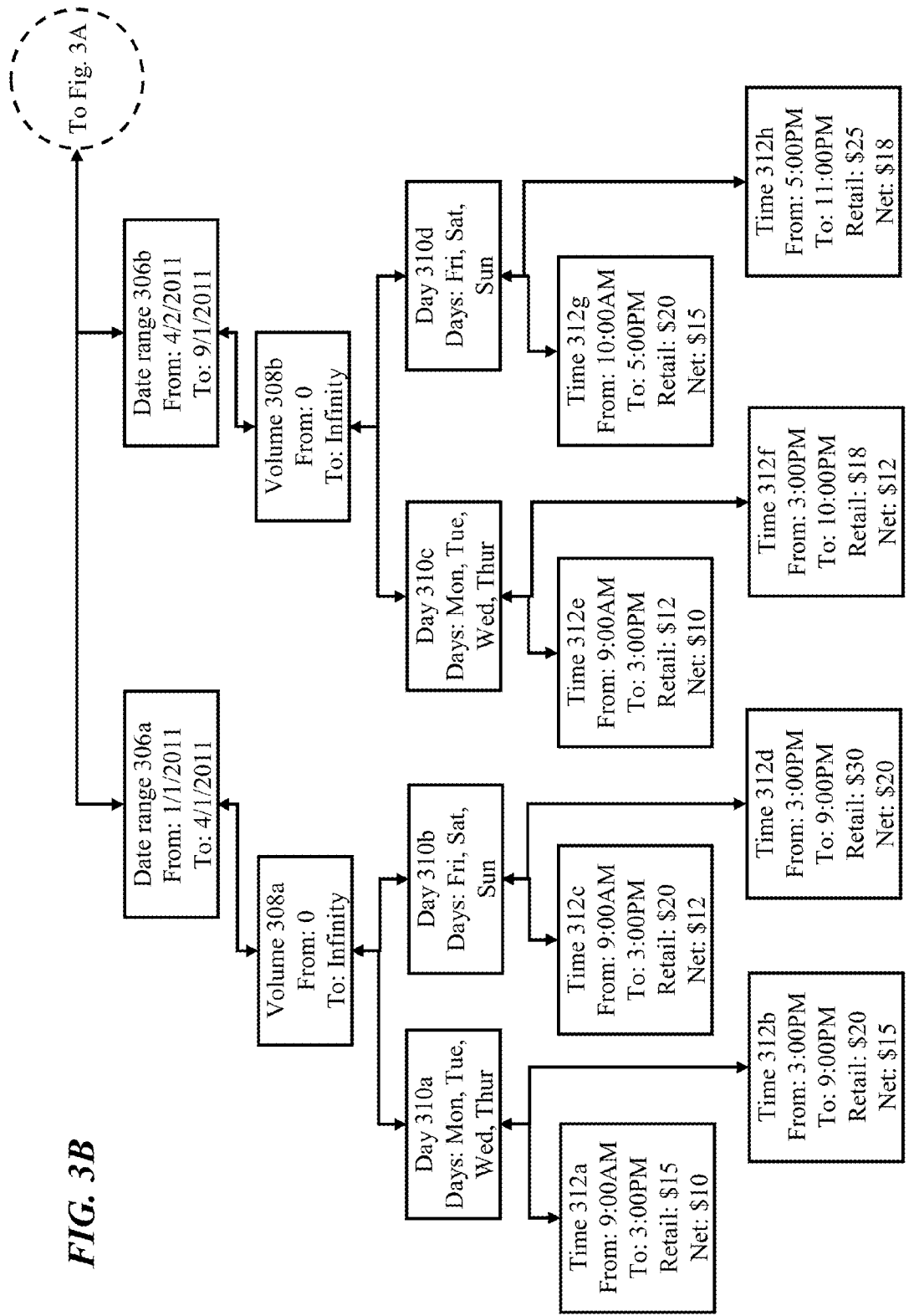

Referring briefly to FIGS. 3A and 3B, illustrated is a block diagram of an embodiment of a hierarchical tree for dynamically pricing goods, services, attractions, events or other items (divided between FIGS. 3A and 3B due to size). The hierarchical tree may represent a plurality of contracts provided by a vendor 302 that vary by term variables 304-312. Although the entire tree may be the result of a contractual agreement between the dynamic pricing service provider and the vendor or item provider, in this context, an item contract may refer to a single leaf of the tree, and variables 304-312 may comprise nodes of the tree. Term variables may include an agreement period 304, or date range that the contracts 312 are valid. In the example shown, for instance, the contracts are valid for the year 2011. Although shown as a single root node, in some embodiments, the agreement period 304 may have multiple sibling nodes representing different date ranges. Similarly, in some embodiments, each vendor 302 may include a single tree, each vendor 302 may include multiple trees, or multiple vendors 302 may be separate nodes on a larger multi-vendor tree. In some embodiments, a root node from a tree may comprise a destination, such as New York City, N.Y., with multiple vendors 302 that provide admissions to events or attractions at the destination as nodes of the tree. This allows for the possibility of grouping items from multiple vendors by destination.

In some embodiments, term variables may include one or more date ranges 306*a*-306*c* (referred to generally as date ranges 306). Date ranges 306 may be a subset of an agreement period 304 date range. In some embodiments, term variables may include one or more volume terms 308*a*-308*d* (referred to generally as volume terms 308); one or more days or day ranges 310-310*h* (referred to generally as days 310); and one or more time ranges 312*a*-312*o* (referred to generally as times 312). In some embodiments, other term variables may be included as nodes in the tree, including a minimum volume type term, a ticket class term (with data values such as first class, business class, economy class, orchestra, balcony, mezzanine, general admission, daytime, nighttime, or any other class), a size term (with data values such as small, medium, large, or any other value, or numeric values, such as those for shoes or dress sizes), an admission type term (with data values such as child, adult, student, veteran, disabled, or any other type), an access duration term (with data values such as one hour, two hours, one day, or any other value), colors of a good, or any other contract term and variable. Thus, the hierarchical tree may be used for goods, services, attractions, events, or any other item, by providing different contract variable terms for nodes.

In some embodiments, nodes may be added to the hierarchical tree at any time, including after purchase of an item by a consumer. For example, a user may purchase an item, specifying one or more contract variable terms. Subsequent to the purchase, the item vendor or dynamic pricing system operator may add an additional contract variable. For example, as part of a promotion for an amusement park, a vendor may provide a reduced price on days when the noon temperature is above 85 degrees Fahrenheit. Accordingly, the vendor may add an additional level to the hierarchical tree with node variables of temperature above 85 degrees Fahrenheit, and at or below 85 degrees Fahrenheit, with different predetermined net and retail prices for the leaves corresponding to these nodes. As discussed in more detail below in part C, these terms may be left unspecified by the user at time of purchase, and subsequently determined at time of access. Accordingly, terms may be added to a consumer's order subsequent to purchase and delivery of the order, providing further flexibility for vendors.

In many embodiments, each item contract leaf may include a retail price and a net price. As discussed above, in many embodiments, a retail price and a net price for each item contract leaf may be set by the vendor or item provider. As shown, each leaf may include different retail and net prices from other leaves. While the net price is shown as a dollar amount, in many embodiments, the net price may be indicated by a vendor-indicated percentage discount from the retail price. In such embodiments, the dynamic pricing engine may calculate a currency amount for the net price, responsive to the vendor-indicated percentage. In many embodiments, the net price may be opaque to consumers or purchasers.

Figure 3C:
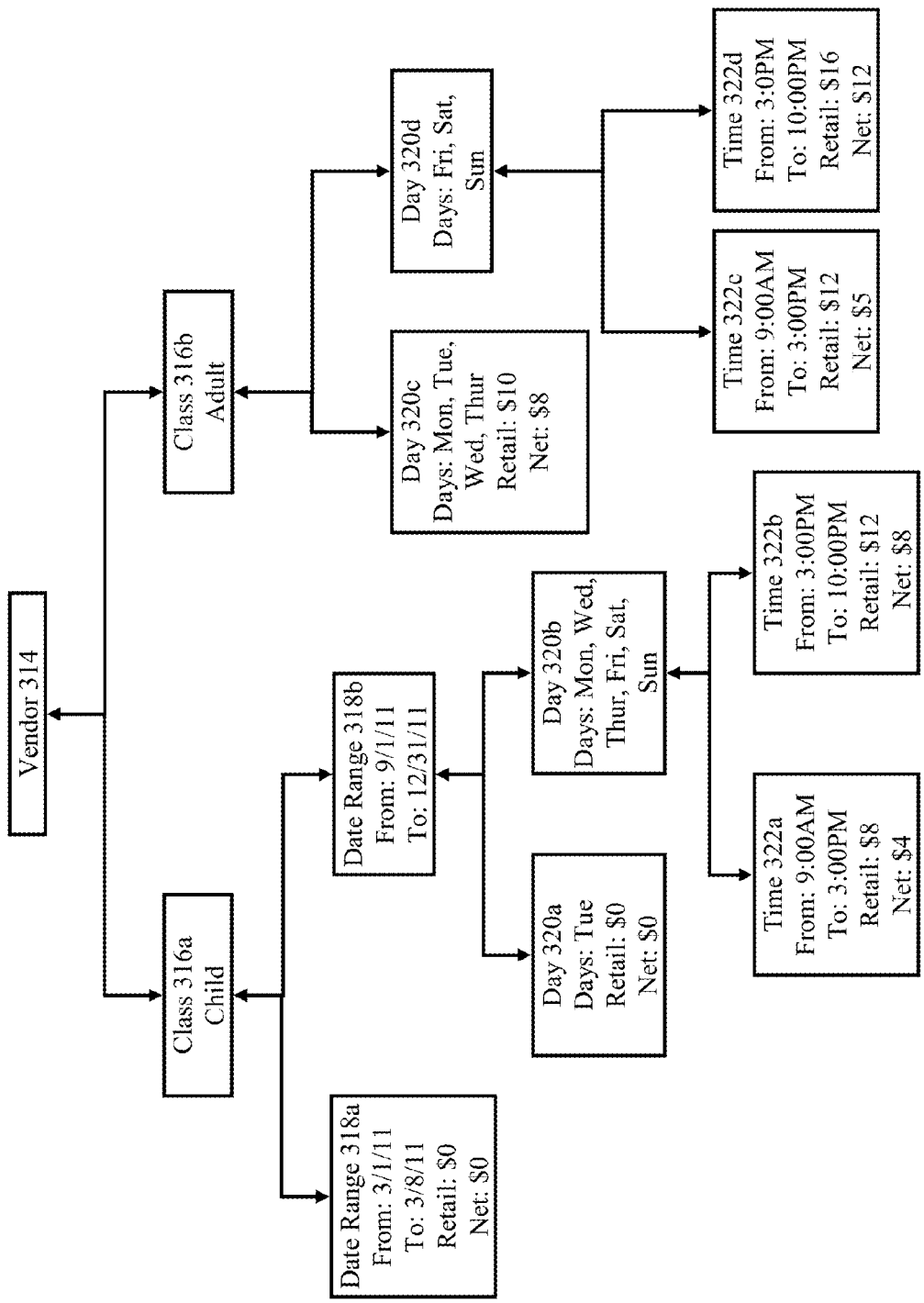
FIG. 3C is a block diagram of another embodiment of a hierarchical tree for dynamically pricing goods, services, attractions, events and other items.

Although the embodiment illustrated in FIGS. 3A and 3B has leaves at all at the same depth in the tree, in many embodiments, the tree may contain leaves at different levels. For example, referring to FIG. 3C, illustrated is a block diagram of another embodiment of a hierarchical tree for dynamically pricing goods, services, attractions, events or other items. In the example shown, leaves exist at three different levels in the tree. This may increase efficiency and flexibility, depending on contract terms and variables. For example, in the embodiment shown, a vendor 314 operating an attraction, such as a science museum, may have a deal where child admission tickets are free during a school vacation week 318a, free every Tuesday, and at variable prices depending on time during other days. Accordingly, when determining a dynamic price for a child's ticket or validating a child's ticket, the dynamic pricing engine may not need to perform additional levels of searching in the tree if the search terminates early. For example, the dynamic pricing engine may identify that the child's admission ticket is being used during the school vacation week and retrieve a retail and net price without needing to further determine a day or time or any other variable.

Although illustrated in a tree form in FIGS. 3A-3C, in many embodiments, the tree may comprise a directory, database, or a series of if-then statements. Accordingly, one skilled in the art should appreciate that the trees may be implemented in many forms without departing from the scope of the invention.

Referring back to FIG. 2, the vendor interface 204 may provide a vendor the ability to specify and define variable terms of the nodes of the hierarchical tree, as well as retail and net prices for each item contract leaf. The tree, or records representing the variables and contract leaf, may be stored in a database, data file, or other storage record in a contract database 208. Although shown on server 200, in many embodiments, contract database 208 may be stored on a database server or other storage device. In some embodiments, vendor interface 204 may provide a self-service mechanism for vendors or attraction operators. For example, in one embodiment, an attraction operator may log in to the vendor interface 204 and provide information about the attraction, pricing information, or other details, such that the system may then automatically allow users to purchase access tickets, without an administrator needing to take further action. In some embodiments, this self-enrollment system may allow an attraction operator to immediately begin using a dynamic pricing system provided by server 200, without requiring configuration by the system provider. In many embodiments, discussed in more detail below, users and attraction operators may use web browsers and/or smart phones for defining tickets, purchasing tickets, and verifying tickets, eliminating the need for expensive point-of-sale systems or other devices.

Still referring to FIG. 2, in some embodiments, a client interface 206 may comprise a web page, interface, application, or other executable code for allowing a client to search for, browse, and/or purchase items. In one embodiment, client interface 206 may comprise a shopping cart system or other interface for allowing a client to select one or more items to add to an order. In some embodiments, client interface 206 may indicate, dynamically as a user selects and deselects items to purchase, a dynamic sale price for the order. Client interface 206 may further indicate a total retail price for the order, as well as indicating a difference or savings between the total retail price and dynamic sale price. In some embodiments, the dynamic sale price may be updated substantially instantly as the user selects and deselects items to purchase, or updated within 250 ms, 100 ms, 50 ms or less. In other embodiments, the client interface 206 may not dynamically update the sale price, but instead update the sale price responsive to the user requesting an update of the price calculation.

A dynamic pricing engine 210 may comprise an application, server, service, daemon, routine, logic, or other executable code for calculating a sale price for one or more items from an order. In some embodiments, the dynamic pricing engine 210 may comprise functionality for applying one or more business margin validation rules to a calculated sale price. In one embodiment, the dynamic pricing engine 210 may comprise functionality for determining a volume discount for an order based on the number of items in the order.

In some embodiments, server 200 may comprise or communicate with a validation engine 212. Validation engine 212, sometimes referred to as a validation system or access validation system, may comprise an application, server, service, daemon, routine, logic, or other executable code for verifying an access token or ticket and/or providing an access token to a purchaser once the purchase has been validated. In some embodiments, an access token may comprise an indicator to an attraction or event that the purchaser has made a valid purchase and should be allowed entry. In other embodiments, an access token may comprise an access code, cookie, or other token usable by a client computing device of the purchaser to access a service, server, or web application.

In some embodiments, validation engine 212 may communicate with or maintain a purchase record database 214. Purchase record database 214 may comprise a database, data file, or other type or form of storage for recording purchase transactions. In one embodiment, a purchase record may indicate that a particular user has purchased a particular item. In another embodiment, a purchase record may indicate that a particular user has purchased an item without specifying one or more contract variables. This may be because the user has purchased an admission or access ticket without specifying a date or time, for example. In such cases, validation engine 212 may further comprise or access a counter, timer, or other service to determine a value (referred to variously as a value, a data value, a variable value, a node value, a term, an access term, or a characteristic) for the one or more contract variables. For example, if a user purchases an admission ticket to an attraction without specifying a date of access, when the user attempts to use the admission ticket, validation engine 212 may determine the date of the attempt use. In a further embodiment, validation engine 212 may search contract database 208 to identify if a valid contract leaf exists corresponding to the determined value for the one or more contract variables. If so, validation engine 212 may respond with an access token or other permission, and initiate payment to the vendor according to the net price indicated in the identified contract leaf.

In some embodiments, validation engine 212 may communicate with a billing or invoice engine 216. Billing or invoice engine 216, referred to generally as a billing engine 216, may comprise an application, server, service, logic, or other executable code for initiating payment to a vendor when an item is delivered to a purchaser or a purchaser uses an access ticket or requests a token or validation of a purchase. In some embodiments, billing engine 216 may also comprise functionality for receiving payment information from consumers to purchase an order of items.

In some embodiments, a vendor computing device 220 may execute a vendor agent 222, and/or a client computing device 224 may execute a client agent 226. Vendor agent 222 and client agent 226 may comprise web browsers, applications, web applets, smartphone applications, kiosk applications, or any other type and form of executable code for providing authentication credentials to authentication agent 202 and interacting with vendor interface 204 or client interface 206.

Figure 3D:
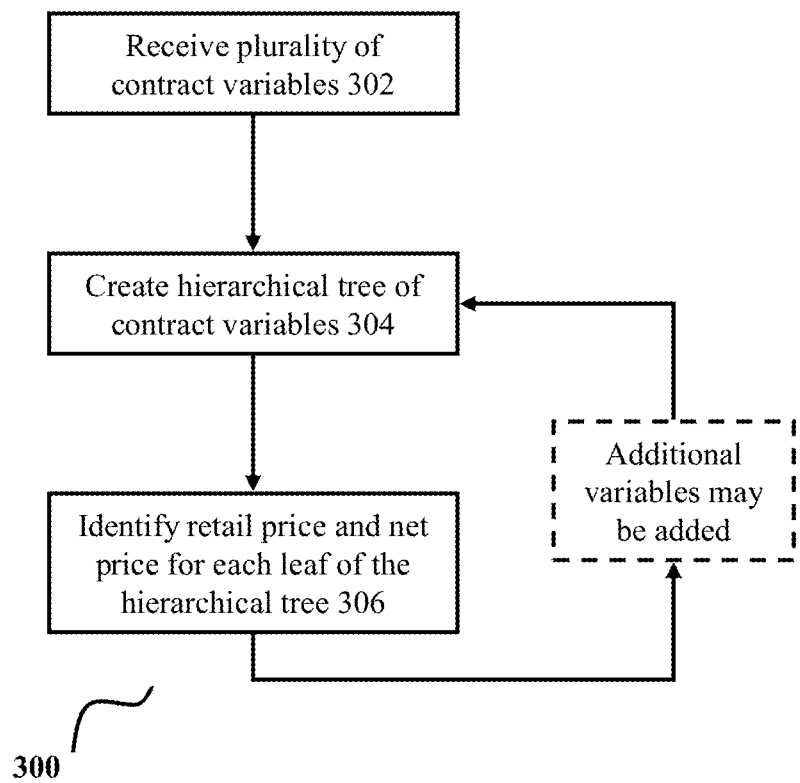
FIG. 3D is a flow chart of an embodiment of a method of dynamically pricing goods, services, attractions, and events through variable contract terms.

Referring now to FIG. 3D, illustrated is a flow chart of an embodiment of a method 300 of dynamically pricing goods, services, attractions, and events through variable contract terms. As discussed above in connection with FIGS. 3A and 3B, a hierarchical tree may be created with each variable contract term comprising a node, and each combination of a retail price and a net price comprising a leaf. In brief overview of method 300, in one embodiment, a server may receive a plurality of contract variables at step 302. In some embodiments, the server may receive one or more values for each of the plurality of contract variables. At step 304, the server may create a hierarchical tree of the received plurality of contract variables. In one embodiment, each node of the tree may correspond to one or more values for each of the plurality of contract variables. In some embodiments, the order of variables may be irrelevant, as the tree may include a leaf node for every possible combination of node variables. In other embodiments, there may be dependencies between nodes, reducing the overall number of leaf nodes. For example, if a first node level represents a range of dates that the contracts are valid including node values from January 1 to July 1, then a second node level representing months may not need to include values for August through December, because any contract leaf including these values would be invalid. However, in most embodiments in which values for each variable are manually entered, dependencies between nodes may be implicit and not need to be explicitly represented in the system (in the example above, the vendor may simply not include the months August through December as possible values).

At step 306, the server may receive a retail price and net price for each leaf of the hierarchical tree. In some embodiments, each leaf may be referred to as a contract, and the retail price and net price may correspond to each contract. In one embodiment, a vendor may input a retail price and net price for each contract using a vendor interface. In some embodiments, the server may receive a default retail price and default net price, and apply the default retail price and default net price to each leaf of the tree. The server may then receive modifications or adjustments to individual retail prices and net prices for each leaf, as desired by the vendor. In many embodiments of method 300, additional variables may be added, repeating steps 304 and 306.

Once a retail price and net price for each contract have been determined, it is possible to determine a business margin and apply one or more business margin rules. FIGS. 4A-4D are pricing diagrams of example embodiments of retail prices and net prices, illustrating determination of business margins. A business margin represents a level of profit for the dynamic pricing system provider, and may comprise a sale price for an item received from a purchaser minus a net price for the item to be paid to the item provider. In some embodiments, the business margin may be further reduced due to expenses, credit card fees, breakage, and/or acquisition costs. In other embodiments, the business margin may increased by a usage rate of the item below 100%. For example, in many embodiments in which the item is a coupon, gift certificate or gift card, reservation, or ticket, the dynamic pricing system provider may receive payment from the purchaser when the item is sold, but the purchaser may never use or redeem the item. In many embodiments, the item may have an expiration date, such as one year from time of purchase, and if the item is not used by then, the item expires. Over time, a usage rate of the item by all purchasers can be statistically determined, which will frequently be less than 100%. Because the dynamic pricing system operator may only have to pay providers the net price for the item when the item is used or redeemed, the entire sale price (or sale price minus expenses) of any unredeemed item may represent profit. Accordingly, the business margin of the item may be increased through a statistically predictable usage or lack of redemption rate.

Referring first to FIG. 4A, illustrated is a first example pricing diagram. In this example, the item may have a fixed retail price 400a of $30, and a fixed net price 402a of $10. If the item is sold at the retail price, the business margin 406a, calculated as profit/price may comprise $20, or 66% of the retail price (note that this simple example does not include the additional expenses, taxes, credit card fees, or acquisition costs). The system may also include a target customer value 404a of 110%. To provide the customer with this minimum customer value, the system may calculate an initial sale price of $27. If the item is priced at this level, the customer saves $3 and the system operator receives a profit of $17. While this satisfies the first business goal of the dynamic pricing system—providing the customer with a minimum target customer value—greater savings may be provided to the customer while satisfying a business margin requirement. For example, the system operator may determine that to remain profitable and experience enough growth, the system needs to provide business margins greater than a lower threshold 410a of 25%. However, the system operator may also determine that business margins greater than an upper threshold 410b of 60% may be unnecessary, and may be returned to the customer as increased savings. Accordingly, in the example shown, the sale price may be further reduced to $25, providing the customer with increased savings while still satisfying business margin requirements of the system operator.

In many embodiments, applying rules based on upper and lower thresholds for a business margin may result in greatly increased savings for the consumer. Referring now to FIG. 4B, illustrated is a second example pricing diagram. Here, due to the very low net price 402b compared to the retail price 400b, the target customer value 404b is almost $10 above the upper threshold 408b. The sale price may be reduced to the upper threshold, satisfying the business margin requirements while providing the customer an almost 50% discount.

Figure 4C:
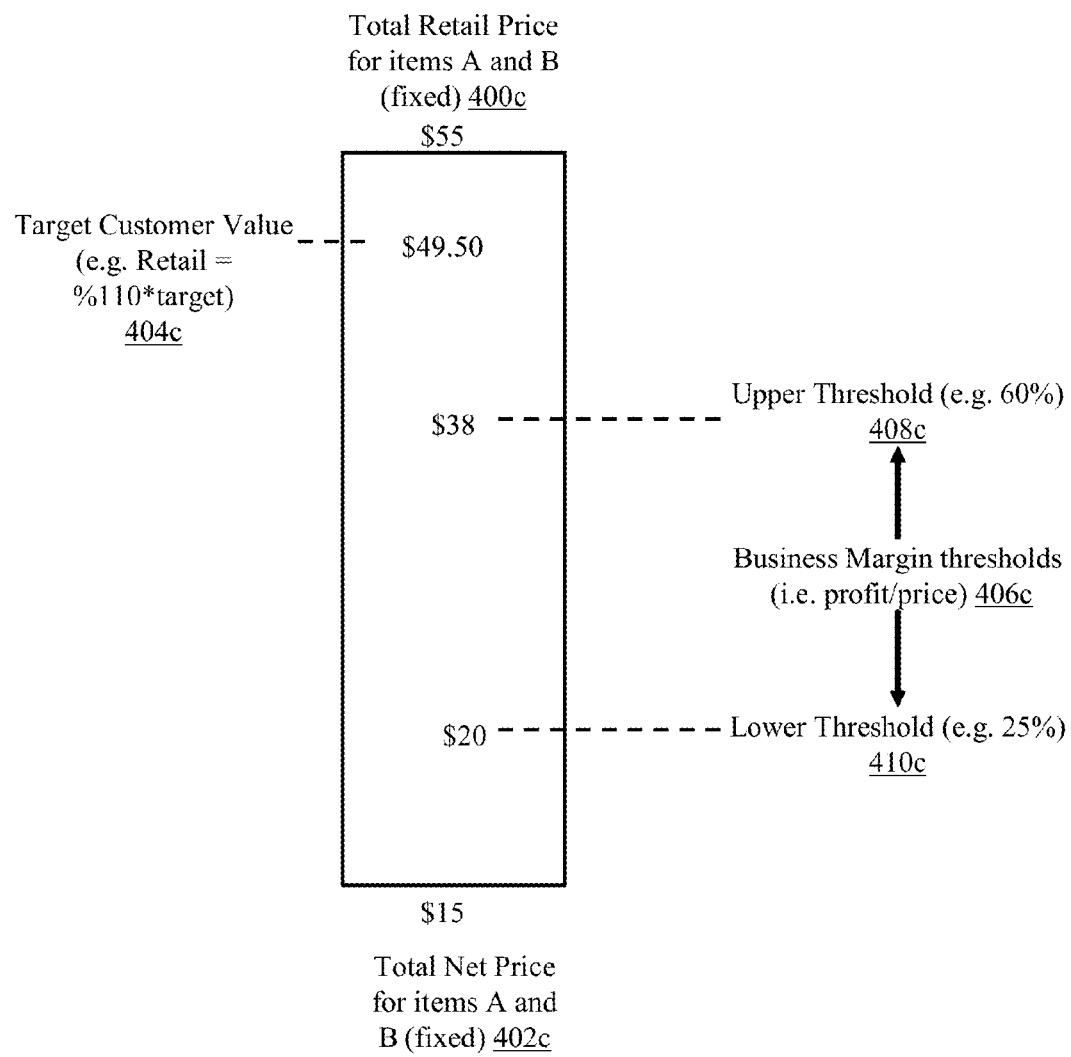

Referring briefly to FIG. 4C, illustrated is an example combined pricing diagram for the examples illustrated in FIGS. 4A and 4B. Because net prices and retail prices are independently fixed for each item, when multiple items are combined in an order, the overall business margin may not correspond to a business margin for each item if they were sold separately. Thus, a very high business margin may be offset by a much smaller or negligible business margin. By calculating a business margin based on the sum retail prices and sum net prices for all items in an order, a discounted sale price for the order may be determined even where one particular item in the order may be sold at or shortly above its net price. This may be more efficient than attempting to apply business margin thresholds to each item individually, and due to the offset between items, may result in greater discounts for consumers than if a discounted sale price were calculated for each item individually and the result totaled.

Figure 4D:
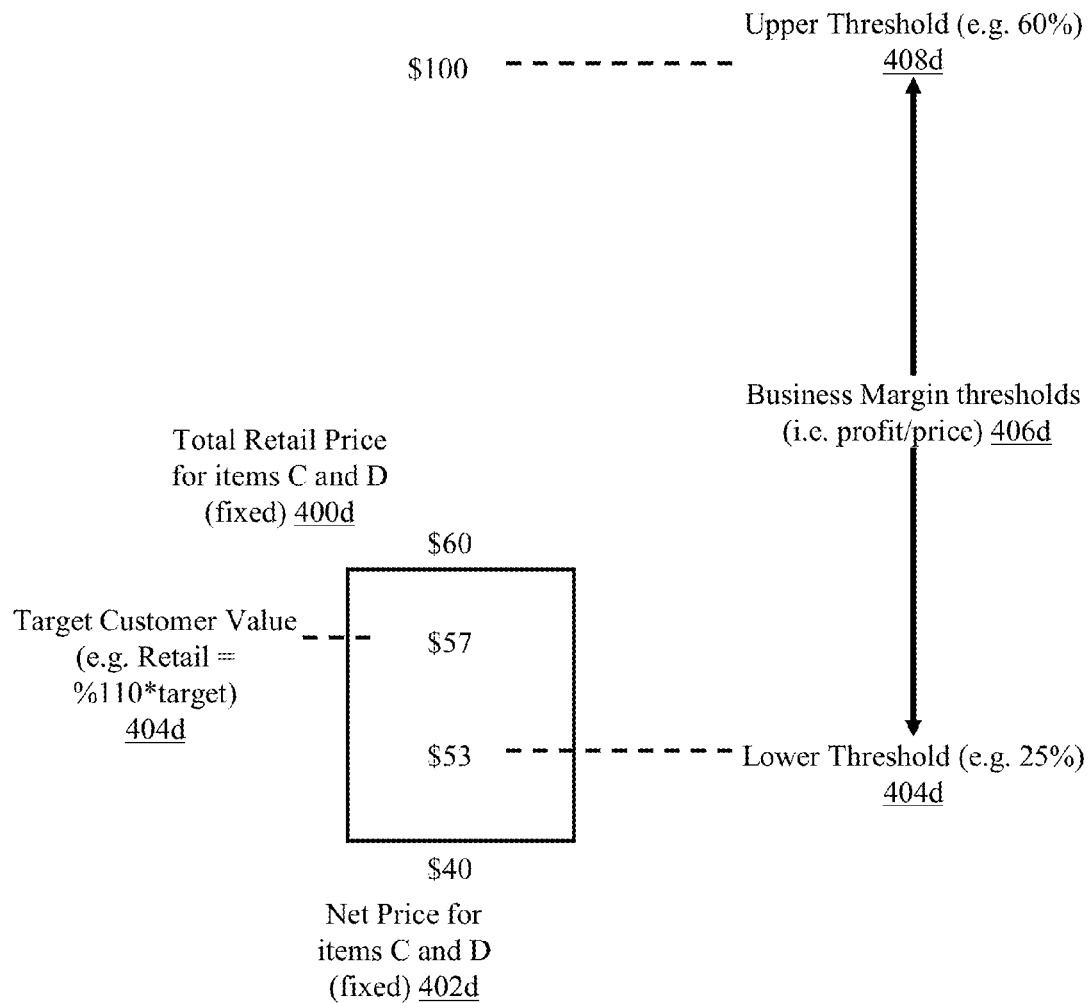

Referring to FIG. 4D, illustrated is an example pricing diagram in which the target customer value 404d lies within the upper and lower business margin thresholds 406d. This may be more typical of real world values, in which a vendor's net price is closer to the retail price for the item. In such cases, if the item is sold at the retail price, the business margin lies within the thresholds, but the customer has not received any discount. Accordingly, in many embodiments, the sale price may be verified against the target customer value 404d to ensure that the customer has received at least the target customer value. In the example shown, the item could be sold at $57, allowing the customer to save 10% off the retail price, while still satisfying the lower threshold of the business margin range.

In a further example not illustrated, the target customer value may lie below the lower the threshold of the range. This may happen, for example, when the net price is very close to the retail price. In one such embodiment, the customer may still be provided with a sale price at the target customer value, even though this results in a business margin below the lower threshold, or a nonexistent business margin. Because consumers are frequently unaware of the business margin, it may be more important to provide consumers with a discount to ensure their satisfaction with the system. Taking a loss on one item may be offset with profits on other items.

Accordingly, dynamic pricing may ensure that the sale price paid by a consumer satisfies minimal revenue margins of the dynamic pricing system operator, includes all available discounts, and always delivers at least the minimal customer discount (overriding any margin conditions). The lower business margin threshold may reflect the minimum revenue margin the dynamic pricing system operator would like to maintain at the time of sale, and may be set globally or per destination, per attraction, per vendor, or via other basis. Similarly, the upper business margin threshold may ensure that the dynamic pricing system operator may pass on additional discounts or savings to the customer. The upper business margin threshold may also be set globally, or per destination, per attraction, per vendor, or on another basis. In some embodiments, the business margin may be calculated as a percentage equal to 100*(total sale price of all items in the order−total net price of all items in the order)/(total net price of all items in the order). In many embodiments, the customer discount, used to verify that the minimum target customer value is achieved, may be calculated as a percentage equal to 100*(total retail price of all items in the order−total sale price of all items in the order)/(total retail price of all items in the order). In one embodiment, an initial sale price of each item, prior to verification against the business margins, may be calculated as equal to the retail price for each item divided by the target customer value.

Figure 4E:
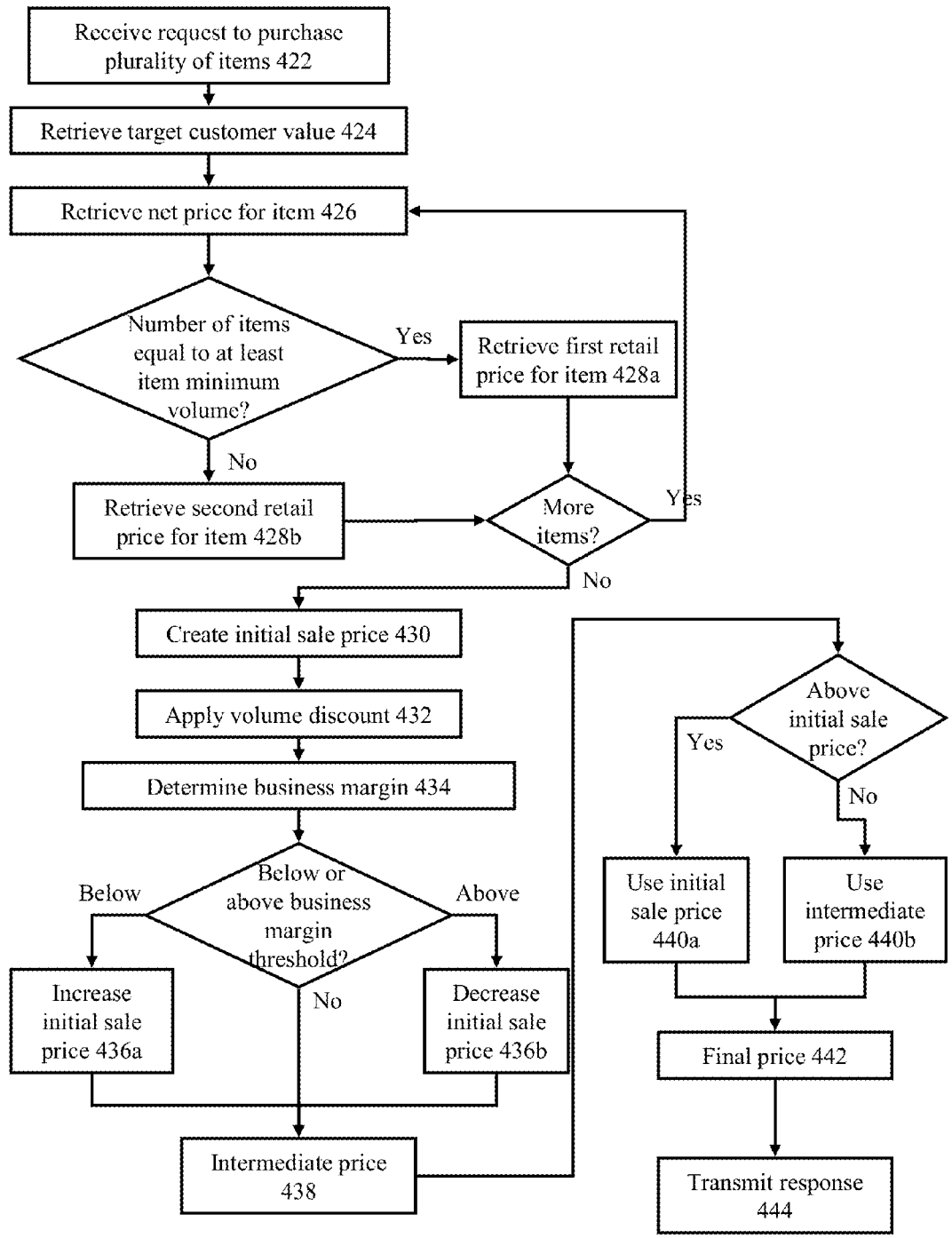
FIG. 4E is a flow chart of an embodiment of a method of balancing a business margin against a target customer value to fulfill a request to purchase one or more items.

Referring now to FIG. 4E, illustrated is a flow chart of an embodiment of a method 420 of balancing a business margin against a target customer value to fulfill a request to purchase one or more items. As discussed above, the one or more items may refer to goods, services, access tickets, admission tickets, tokens, coupons, gift certificates, or any other inventory item, or any combination of these items. In brief overview, at step 422, a computing device performing dynamic pricing may receive a request from a user to purchase a plurality of items. In some embodiments, each item may have a retail price and a predetermined net price. As discussed above, in some embodiments, a vendor of an item may set a minimum volume amount. In embodiments using a minimal volume type, each item may have a first retail price used when the number of items in an order is below said item's minimal volume type value, and may have a second retail price used when the number of items in the order is equal to or greater than said item's minimal volume type value. In one embodiment, the second retail price may comprise the first retail price, minus a target customer value discount.

At step 424, a dynamic pricing engine executed by the computing device may retrieve a target customer value. At step 426, the dynamic pricing engine may retrieve a net price for the first item of the plurality of items. In some embodiments using a minimal volume type, if the number of items exceeds or equals the first item's minimum volume value, then at step 428*a*, the dynamic pricing engine may retrieve a first retail price for the item. This may comprise a predetermined retail price set by the vendor, discounted by the target customer value. In some embodiments, this may be referred to as an initial sale price for an item, a discounted retail price, or a retail price. If the number of items is below the first item's minimum volume value, then at step 428*b*, the dynamic pricing engine may retrieve a second retail price for the item. In some embodiments, this may be referred to as an undiscounted retail price, a predetermined retail price, or a maximum retail price. This may comprise the predetermined retail price set by the vendor. Steps 426-428*b* may be repeated iteratively for each item of the plurality of items.

At step 430, the dynamic pricing engine may create an initial sale price. The initial sale price may comprise a sum of the retrieved discounted retail prices or undiscounted retail prices retrieved at steps 428*a*-428*b* for each item. In some embodiments, the initial sale price may thus comprise a sum of the retail prices for the plurality of items, discounted by a predetermined target customer value. At step 432, in some embodiments, a volume discount may be applied to the initial sale price.

At step 434, in some embodiments, the dynamic pricing engine may determine a business margin. The business margin may be based off the initial sale price, with or without the volume discount (still referred to generally as the initial sale price), and a sum of the net prices for each item. If the business margin is below a lower business margin threshold, then at step 436*a*, the initial sale price may be increased such that the business margin is equal to or greater than the lower business margin threshold. If the business margin is above an upper business margin threshold, then at step 436*b*, the initial sale price may be decreased such that the business margin is equal to or less than the upper business margin threshold. In either case, the adjusted result may comprise the intermediate price at step 438. Conversely, if the business margin is equal to one of or lies between the upper and lower business margin thresholds, then the initial sale price or volume-discount-adjusted initial sale price comprises the intermediate price at step 438.

If the intermediate price is above the initial sale price, then at step 440*a*, the initial sale price may be used as the final price 442. If the intermediate price is equal to or below the initial sale price, then at step 440*b*, the intermediate price may be used as the final price 442. This may be done in some embodiments to ensure that the customer receives at least a minimum target value. At step 444, in some embodiments, the system may transmit a response to the request to purchase the plurality of items.

Still referring to FIG. 4E and in more detail, at step 422, a computing device performing dynamic pricing may receive a request from a user to purchase one or more items. The request may comprise an API request, data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. For example, the user may install an item ordering application on a mobile computing device to allow ease of making purchases, reserving tickets, or performing other similar functions. In other embodiments, the request may be received via entry at a kiosk. In still other embodiments, a third party, such as a ticket agent or customer service agent, may generate the request on behalf of the user. For example, the user may direct the third party via a telephone, oral, or written communication that they wish to purchase one or more items, and the third party may generate the request that is received by the computing device performing dynamic pricing.

The request may include one or more characteristics or terms for each of the one or more items, such as a size or color or shipping terms for a good, an access time or date for an admission ticket, a class of admission ticket such as child, adult, balcony, orchestra, or other class, or any other type and form of characteristic or term. In many embodiments, the request may not specify one or more terms or characteristics. In a further embodiment, the one or more terms or characteristics not specified may be required to fulfill the order or utilize the ticket or coupon or other item. For example, a date of entry for an attraction may be unspecified in the request, even though a date of entry is necessarily established when the user enters the attraction. In another example, the request may not specify whether a user will pick up a purchased good at a store location or have the good shipped to the user. This allows the user to make such determinations at a later date, allowing flexibility in schedules.

At step 424, a dynamic pricing engine executed by the computing device may retrieve a target customer value. The target customer value may represent a percentage or amount of currency saved by the customer when purchasing at a discounted price as opposed to a full retail price. For example, if an item normally sells for $20, and the customer purchases the item at a discounted price of $19, the customer has saved 5% of the retail price. In some embodiments, the target customer value may represent an amount saved, such as the 5% in the example, while in other embodiments, the target customer value may represent a retail price divided by a sale price. In such an embodiment of the previous example, the target customer value would be $20/$19 or 105%. In some embodiments, the target customer value may represent a threshold of a minimum guaranteed discount. For example, the target customer value may be used to ensure that a customer always receives at least a 5% discount off the retail price or prices of purchased items. While the example described above uses a 5% discount or 105% vs. retail value, other values may be used, such as 10%, 15%, 20%, or any other value.

In many embodiments, the target customer value may be a predetermined value set by the operator of the dynamic pricing system. In a further embodiment, the target customer value may be a universal value, applied to all items. In other embodiments, the target customer value may be a value set by a vendor of at least one item of the one or more items in the request. In a further embodiment, the target customer value may be a vendor-specific value applied to all items provided by that vendor. In other embodiments, the target customer value may be destination-specific, item-specific, or even customer-specific. For example, in one such embodiment, a first target customer value such as 110% may be applied to new customers or first-time users, while a second target customer value such as 105% may be applied to returning customers. This may be done to encourage first-time users to try the system.

At step 426, the dynamic pricing engine may retrieve a net price for the first item of the plurality of items. In some embodiments, each item may have a predetermined net price. Such predetermined net price may be set by a vendor of the item. The net price may comprise a price to be paid to the vendor when the item is purchased, and may be specified in an agreement between the vendor and the dynamic pricing system operator. In some embodiments, the net price may be paid immediately upon purchase, while in other embodiments, the net price may be paid at some point in the future, such as a monthly accounting, 30 day term, or other term.

In many embodiments, the predetermined net price may specific to one or more terms or characteristics of the item in the request. For example, the predetermined net price may be a first value for a large t-shirt and a second value for a small t-shirt, or may be a first value for a day lift ticket and a second value for an evening lift ticket, or may be a first value for an orchestra seat and a second value for a balcony seat. As shown in the hierarchical tree diagrams illustrated in FIGS. 3A-3C, the net price may be based on one or more variables of the request and may be retrieved by searching the tree for a leaf corresponding to the variables in the request.

As discussed above, in many embodiments, one or more terms or node variables for an item may not be included in the request. In such embodiments, retrieving a net price may comprise searching a hierarchical tree for one or more leaves corresponding to variables that are included in the request. For example, if a request specifies an adult admission, but does not specify a day of the week, multiple leaves corresponding to adult admissions for each day of the week may be found. When multiple corresponding leaves are found, in one embodiment, the dynamic pricing engine may retrieve the highest net price identified in the multiple corresponding leaves. For example, referring briefly back to the hierarchical tree illustrated in FIG. 3C, if the user specified in the request that the item was a child ticket, but did not specify a date range, day, or time, the dynamic pricing engine may identify the highest net price of $8 among the four leaves corresponding to child tickets. If instead the user specified that the ticket was an adult ticket, to be used on a Saturday, the dynamic pricing engine may identify the highest net price of $12 from the two leaves corresponding to adult tickets used on a Saturday. This may be done so that the net price used for calculating sale prices and business margins is a "worst-case" net price, or maximum amount to be paid to the vendor regardless of the value of the unspecified variable. In other embodiments, the dynamic pricing engine may retrieve the lowest net price identified. In still other embodiments, the dynamic pricing engine may retrieve an average net price calculated as an average of the net prices identified in the multiple corresponding leaves. In a further embodiment, the average net price may be calculated as a weighted average based on the number of leaves including the value, or based on the variable range for each leaf. For example, in one such embodiment using the above example, a weighted average net price may be calculated by a sum of each net price multiplied by the number of days the net price applies to, divided by the total number of applicable days. In other embodiments, average net prices may be weighted by a statistical probability of each variable being applied to an order. For example, if admissions tickets to a particular attraction are historically used 60% of the time on Friday, 20% on Saturday, and the remaining 20% across the remainder of the week, these percentages may be used in calculating an average net price. In a further embodiment, such percentages may be dynamically updated by the dynamic pricing engine as each order is validated, fulfilled, used, or accessed.

As discussed above, in some embodiments, a vendor of an item may set a minimum volume amount. In embodiments using a minimal volume type, each item may have a first retail price used when the number of items in an order is equal to or above said item's minimal volume type value, and may have a second retail price used when the number of items in the order is below said item's minimal volume type value. In one embodiment, the first retail price may comprise the second retail price, minus a target customer value discount. Accordingly, in such embodiments, the second retail price may be considered a predetermined retail price and the first retail price may be considered a calculated or adjusted retail price.

In some embodiments using a minimal volume type, if the number of items exceeds or equals the first item's minimum volume value, then at step 428*a*, the dynamic pricing engine may retrieve a first retail price for the item. This may comprise a predetermined retail price set by the vendor, discounted by the target customer value discussed above. In some embodiments, the first retail price may be referred to as an initial sale price for an item, a discounted retail price, or a retail price. If the number of items is below the first item's minimum volume value, then at step 428*b*, the dynamic pricing engine may retrieve a second retail price for the item. In some embodiments, this may be referred to as an undiscounted retail price, a predetermined retail price, or a maximum retail price. This may comprise the predetermined retail price set by the vendor.

In some embodiments, steps 428*a*-428*b* may be performed to allow a dynamic pricing system operator to apply volume discounts to purchases, while still charging a full retail price for a consumer who purchases only a single item. This may be done to prevent undercutting direct sales from a single vendor. For example, the dynamic pricing operator may sell admissions tickets to a science museum and computer museum that are not operated by the same vendor. To prevent undercutting individual sales of tickets at each museum, the dynamic pricing operator may charge full price for a single admission ticket, while discounting a combined admission ticket to both museums. This may be desirable for attracting vendors to provide inventory to the dynamic pricing system, for whom a reduced net price represents lost profit.

For example, to encourage purchases of multiple items, the operator may apply a 0% volume discount to purchases of a single item, a 5% volume discount to purchases of 2 or 3 items, a 10% volume discount to purchases of 4 items, etc. The sale price for the purchases including a plurality of items may be dynamically calculated and balanced against a business margin, while the sale price for the purchases of a single item may be set equal to the predetermined or non-discounted retail price. Steps 426-428*b* may be repeated iteratively for each item of the plurality of items.

At step 430, the dynamic pricing engine may create an initial sale price. The initial sale price may comprise a sum of the retrieved discounted retail prices or undiscounted retail prices retrieved at steps 428*a*-428*b* for each item. In some embodiments, the initial sale price may thus comprise a sum of the retail prices for the plurality of items, discounted by a predetermined target customer value. In one embodiment, the dynamic pricing engine may discount each retail price individually by the target customer value. In another embodiment, the dynamic pricing engine may sum each retail price and then reduce the sum of the retail prices by the target customer value. In one such embodiment, steps 428*a*-430 may be combined into a single step by calculating a sum of the predetermined retail prices of each item, and if the total number of items is less than the minimum volume value of each item, then the initial sale price may be equal to the predetermined retail price. Conversely, if the total number of items is equal to or greater than the minimum volume value of each item, then sum of the predetermined retail prices may be discounted by the target customer value to create the initial sale price.

At step 432, in some embodiments, a volume discount may be applied to the initial sale price. In one embodiment, a volume discount may be applied based on the number of items in the request. For example, if there are 2 items in the request, a discount of 5% may be applied to the initial sale price, while if there are 5 items in the request, a discount of 10% may be applied to the initial sale price. Different numbers of items and values of discounts may be used. In some embodiments, the number of items and corresponding discounts may comprise one or more policies applied by the dynamic pricing engine, and set by the operator of the dynamic pricing system. In many embodiments, the number of items and corresponding discounts may be vendor-specific, destination-specific, attraction-specific, item-specific, or user-specific.

At step 434, in some embodiments, the dynamic pricing engine may determine a business margin. The business margin may be based off the initial sale price, with or without the volume discount (still referred to generally as the initial sale price), and a sum of the net prices for each item. As discussed above in connection with FIGS. 4A-4D, the business margin may comprise a profit value divided by a price value, or an initial sale price (or sum of the retail or discounted retail prices for each of the one or more items in the order) minus a sum of the net prices for each of the one or more items in the order, divided by the initial sale price. Although referred to as a profit value, in many embodiments, this may represent a gross profit value or return, not including expenses of the dynamic pricing system. In other embodiments, rather than calculating profit/sale price, the business margin may comprise a profit/sum of the net prices value, or a sale price/sum of the net prices value, or any similar value that may be used for comparing to thresholds for balancing a business margin against a customer discount. Accordingly, given an input of a predetermined retail price and a predetermined net price, various comparisons may be made to determine whether an intermediate sale price should be raised or lowered to meet business goals of the dynamic pricing system operator without departing from the scope of the invention. In some embodiments, the business margin may be calculated responsive to one or more additional values, including taxes; transaction or credit card fees; business overhead expenses such as salaries, rent, data storage prices, network service expenses, consulting fees, legal expenses, marketing and advertising expenses, materials, or other expenses; breakage or underutilization of tickets, tokens, coupons, gift certificates or cards; or any other type and form of expense variable. The business margin may be calculated as an amount of currency, e.g. a dollar amount, or may be calculated as a percentage.

In many embodiments, an upper or lower business margin threshold may be predetermined by the operator of the dynamic pricing system. The lower and upper business margin thresholds may be set respectively responsive to (i) a minimum return necessary to run the dynamic pricing system and pay expenses; and (ii) a maximum return desired by the dynamic system operator, above which further returns may be passed on to the consumer as discounts. In some embodiments, the upper or lower business margin thresholds may be adjusted by the operator of the dynamic pricing system responsive to market demand, interest rates, monthly quotas, or other conditions. In one embodiment, only one threshold may be utilized. For example, the business margin may only be compared to a lower threshold without additional discounts being passed on to the consumer, although this may be less desirable for marketing reasons.

If the business margin is below a lower business margin threshold, then at step 436*a*, the initial sale price (or volume-discounted initial sale price) may be increased such that the business margin is equal to or greater than the lower business margin threshold. If the business margin is above an upper business margin threshold, then at step 436*b*, the initial sale price (or volume-discounted initial sale price) may be decreased such that the business margin is equal to or less than the upper business margin threshold. In either case, the adjusted result may comprise the intermediate price at step 438. In some embodiments, step 434 may be repeated after adjusting the adjusted initial sale price to recalculate the business margin. If the business margin is equal to one of or lies between the upper and lower business margin thresholds, then in some embodiments, the initial sale price or volume-discount-adjusted initial sale price may comprise the intermediate price at step 438.

Having adjusted the initial sale price or volume-discounted sale price responsive to the business margin thresholds to create the intermediate price at step 438, in many embodiments, the intermediate price may be further compared to or validated against the initial sale price. As discussed above, the initial sale price may represent the total retail price of the one or more items in the order, discounted by the target customer value. For some values of net prices and business margin thresholds, the initial sale price (or volume-discounted initial sale price) may have been increased at step 436*a* to a value such that the intermediate price is greater than the initial sale price. Therefore, if the items are sold at this intermediate price, the user would not receive the target customer value of discount compared to the retail price. Accordingly, in many embodiments, the intermediate price may be compared to the initial sale price at step 440*a*-440*b* to determine a final price 442. If the intermediate price is above the initial sale price, then at step 440*a*, the initial sale price may be used as the final price 442. If the intermediate price is equal to or below the initial sale price, then at step 440*b*, the intermediate price may be used as the final price 442. This may ensure that the customer receives at least a minimum target value.

As discussed above, in some embodiments utilizing a minimum volume type to prevent undercutting direct sales by vendors, if a request includes a number of items less than the minimum volume item (for example, if the request is to purchase only a single item), the item may be priced at the retail price of the item. Therefore, in such embodiments, it may be undesirable to perform the business margin comparisons and/or target customer value comparisons of steps 436-440. Accordingly, in a further embodiment of method 420, if no retail prices of items in the order were reduced at step 428*a* because the number of items in the order was below the minimum volume value for each item, then final price 442 may be set equal to the sum of the retail prices of the items.

At step 444, in some embodiments, the system may transmit a response to the request to purchase the plurality of items. In some embodiments, the system may transmit the response to a computing device of the user, while in other embodiments, the system may transmit the response to a computing device of a third party, such as a ticket agent or broker or customer service agent. In a further embodiment, the system may provide the user with an opportunity to purchase the one or more items at the final price 442, such as via a credit card, debit card, check, or other means.

C. Systems and Methods for Selling and Validating Access Tickets or Tokens

As discussed above, in many embodiments, the dynamic pricing system described herein may be used to purchase one or more items while leaving one or more terms or characteristics of the item unspecified. For example, in one such embodiment, a user may purchase an admission ticket to a museum or access pass to a nightclub, without specifying a day, time, or date of entry. As discussed above, in some embodiments, the item may be priced based on a highest net price for the item of a plurality of net prices identified as leaves in a hierarchical tree corresponding to one or more specified terms or characteristics of the item in the order and each variable value of the one or more unspecified terms or characteristics of the item in the order. For example, referring briefly back to the hierarchical tree illustrated in FIG. 3C, if the user specified in the request that the item was a child ticket, but did not specify a date range, day, or time, the dynamic pricing engine may identify the highest net price of $8 among the four leaves corresponding to child tickets. If instead the user specified that the ticket was an adult ticket, to be used on a Saturday, the dynamic pricing engine may identify the highest net price of $12 from the two leaves corresponding to adult tickets used on a Saturday. In other embodiments, different variables may be left unspecified, such as size or color of a clothing item or other good; shipping options, such as class of shipment; whether an item will be delivered or picked up; whether a software program will be downloaded or mailed on a CD or DVD; or any other type and form of variable. Accordingly, while the examples illustrated in FIGS. 3A-3C include temporal variables (e.g. date range, day, and time) and class variables (e.g. adult or child) for admission or access tickets, the concepts can apply equally to other variables that may be applicable to admission or access tickets, or may not be applicable (e.g. color, size, material, pattern, shipping, etc.). By basing price calculations off the highest net price, the dynamic pricing system allows for flexibility by the user while preserving business margin goals of the system operator.

When the item order is fulfilled (such as when the goods are shipped or otherwise delivered to the user, when the user uses the gift card or certificate, when the user accesses the attraction or event or otherwise uses the ticket or token, or at similar times), values that were unspecified by the user at the time of ordering may be fixed. Because these values must be fixed when the order is fulfill, these may be considered terms that are required to be specified for the order to be fulfilled. In some embodiments, the user may expressly specify the value prior to fulfillment, such as where the user determines that they want an item delivered or shipped first class as opposed to ground. In other embodiments, the value may be specified as a result of the user's actions, such as a time or date of access. Once the values are specified, the dynamic pricing system may determine an actual net price, which may be less than the net price identified during calculation of the sale price for the item. This actual net price may be provided to the item vendor, either immediately or at some point in the future according to a billing or payment agreement.

For example, still referring to FIG. 3C, in the example embodiment illustrated, if a user purchases an adult ticket without specifying a day or time of access, the dynamic pricing engine may use the highest leaf net price of $12 for calculating business margins and determining the sale price. If the user subsequently uses the ticket on a Monday, then only the actual net price of $8 may be due to the vendor. Accordingly, it may be desirable for the dynamic pricing system to include functionality for determining an actual net price when a term that was unspecified at the time of purchase becomes specified.

Furthermore, the same functionality for determining the actual net price may provide an ability to validate or verify an access or admission request where one or more terms were unspecified at the time of purchase and once specified, may be either valid or invalid. For example, a user may purchase an access ticket to an attraction without specifying a time or date of entry. The attraction may be accessible through an automated kiosk, an electronic gate, or other similar feature that allows the user to gain access upon inserting, scanning, dipping, or otherwise utilizing a valid ticket. For example, in one embodiment, the ticket may be a multiday access pass for a subway system, and the gate may be an automated gate that opens when the ticket is inserted into a reader. When the user inserts the ticket into the reader, the reader may send a validation request to the dynamic pricing system. In some embodiments, the validation request may indicate that the ticket was purchased with one or more terms unspecified, such as a day or time of entry. The dynamic pricing engine may search a hierarchical tree for a leaf or contract corresponding to (i) values for the ticket that were specified at time of purchase (such as an adult admission, or a destination city), and (ii) values for the ticket that are specified or fixed when the request is made or when the ticket is validated (such as a current timestamp or date). If a corresponding leaf exists, then the ticket is valid, and the dynamic pricing system may respond with a message indicating the ticket is valid. For example, still referring to the example shown in FIG. 3C, if a request is made to validate or allow access via an adult ticket that was purchased without a day or time specified, and the request is made at 8:00 AM on a Friday, no leaf corresponds to that combination of terms (the time range in 322c is from 9:00 AM to 3:00 PM). Accordingly, the system may respond that the request is invalid at this time. In a further embodiment, the response may indicate what value is needed for the ticket to be valid, such as indicating that the ticket will become valid at 9:00 AM.

In a similar example, a user may purchase a ticket to a matinee showing of a movie, without specifying the day or time of use, or even which movie or theater. When the user attempts to use the ticket, a request may be sent to the dynamic pricing system, which may search a hierarchical tree for a leaf corresponding to a matinee ticket at the time and day of the request. If the request is made at a time when a regular movie is showing rather than a matinee, then the hierarchical tree may have no leaf corresponding to a matinee ticket at that time, and the dynamic pricing system may properly respond that the ticket is not valid or that access should not be allowed.

Figure 5A:
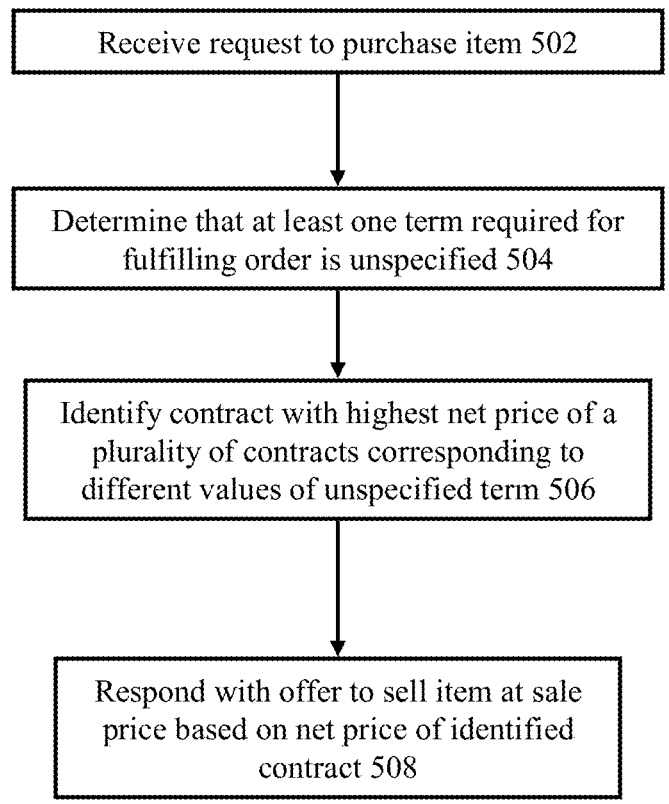
FIG. 5A is a flow chart of an embodiment of a method of selling an access ticket with an unspecified term.

Referring now to FIG. 5A, illustrated is a flow chart of an embodiment of a method 500 of selling an item with an unspecified term. In brief overview, at step 502, the server or dynamic pricing system may receive a request to purchase an item. At step 504, the dynamic pricing system may determine that at least one term required for fulfilling the order is unspecified. At step 506, the dynamic pricing system may identify a contract or leaf with a highest net price of a plurality of contracts or leaves corresponding to different values of the unspecified at least one term. At step 508, the dynamic pricing system may respond with an offer to sell the item at a sale price based on the net price of the identified contract or leaf.

Still referring to FIG. 5A and in greater detail, at step 502, the server may receive a request to purchase an item. The request may be received using any of the methods or systems discussed herein. In some embodiments, the request may comprise an API request, a data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. In some embodiments, the request may specify a first one or more terms for the item, such as class, size, type, time, date, day, month, duration, color, delivery or shipment method, or any other characteristic of the item. In many embodiments, the request may not specify a second one or more terms. The second one or more terms may be required to be fixed, specified, or otherwise established in order to fulfill the purchased order, such as any of the terms mentioned above. Terms may be fixed explicitly, such as the purchaser specifying a value of the term at time of fulfillment of the order, or terms may be fixed implicitly, such as a timestamp or date of access. In some embodiments, the item may be an access ticket to an attraction or an event, a theater ticket, a movie ticket, a museum admission, an access token to an online application or multiplayer game, a book, clothing, an electronic book, a gift card, a gift certificate, or any other type and form of item discussed herein.

At step 504, in some embodiments, a dynamic pricing engine may determine that at least one term required for fulfilling the order is unspecified. In some embodiments, the request may explicitly identify that at least one required term is unspecified. In other embodiments, the dynamic pricing engine may inspect the request to identify that a required term is missing or unspecified. In still other embodiments, the dynamic pricing engine may search a hierarchical tree for a leaf (sometimes referred to as a contract) corresponding to the request using one or more terms specified in the request. In one such embodiment, if the dynamic pricing engine only finds a single leaf corresponding to the terms specified in the request, then no additional terms are required to be specified. Conversely, if the dynamic pricing engine finds a plurality of leaves or contracts corresponding to the terms specified in the request, then any terms with values that vary between the leaves may be required to be specified for the order to be fulfilled. Searching the hierarchical tree may be performed using any search algorithm.

At step 506, in some embodiments, the dynamic pricing engine may identify a leaf or contract with the highest net price of a plurality of leaves or contracts corresponding to the terms specified in the request and different values of the unspecified term. In some embodiments, identifying the leaf with the highest net price may comprise comparing each net price of a plurality of leaves to determine the leaf with the highest net price. In some embodiments, the highest net price may be shared by multiple leaves with the same net price. In such embodiments, the dynamic pricing engine may identify either leaf, or may otherwise retrieve the net price from either leaf.

At step 508, in some embodiments, the dynamic pricing engine may respond to the request with an offer to sell the item at a sale price based on the net price of the identified leaf. In other embodiments, the dynamic pricing engine may respond to the request with an offer to sell the item at a sale price based on the highest net price identified in the plurality of contracts. In many embodiments, the sale price may be determined according to method 420, discussed above.

Figure 5B:
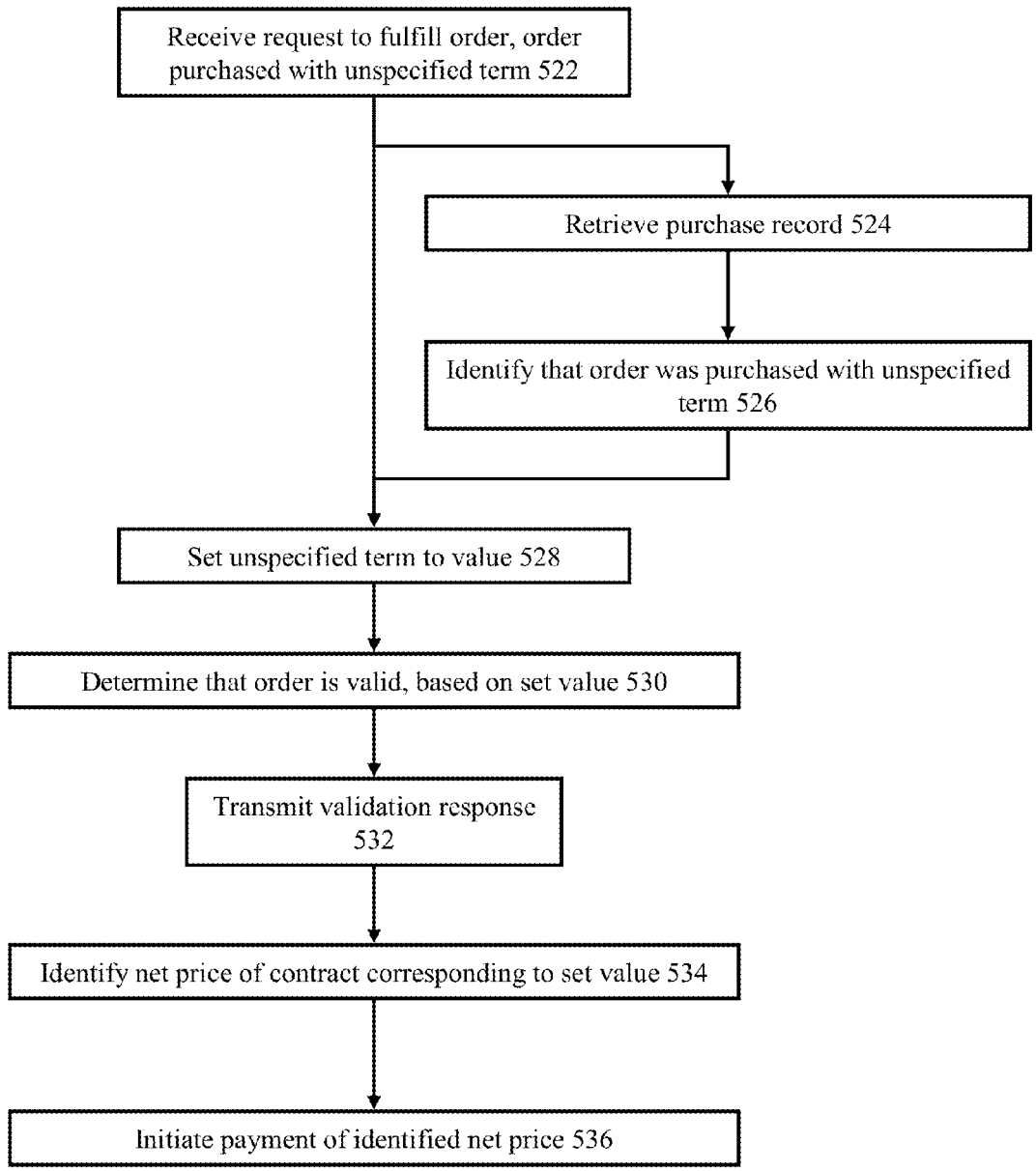
FIG. 5B is a flow chart of an embodiment of a method of validating an access ticket with an unspecified term.

Referring now to FIG. 5B, illustrated is a flow chart of an embodiment of a method 520 of validating an order purchased with an unspecified term. In some embodiments, the order may comprise an order for an access ticket or admission ticket or access token. In such embodiments, validation may comprise determining the ticket or token is valid and/or allowing access based on a determined value for an access term unspecified at the time of purchase. In other embodiments, the order may comprise an order for goods or services. In such embodiments, validation may comprise determining that the order is valid and fulfilling the order based on a determined or specified value for a term unspecified at the time of purchase.

At step 522, a validation system may receive a request to fulfill or validate an order, the order having been purchased with at least one unspecified term required to be specified to fulfill or validate the order. In some embodiments, the request may indicate that the order was purchased with at least one unspecified term. For example, the request may identify the one or more terms that were unspecified. In other embodiments, the request may only identify the order. For example, the request may include an order number or purchase number or another identifier to uniquely identify the order. The identifier may be encoded in a bar code, data matrix code, magnetic strip, or other marking system. In such embodiments, at step 524, the validation system may retrieve an order or purchase record associated with the identifier and, at step 526, identify that the order was purchased with the at least one unspecified term.

At step 528, the validation system may set the at least one unspecified term or terms to a value. In some embodiments, the validation system may retrieve the value from a counter, timer or other service. For example, in one embodiment in which the unspecified term is a time, the validation system may retrieve a timestamp from a timer or time server. In embodiments in which the unspecified term is a destination name, event name, venue name, attraction name, or other similar characteristic, the validation system may retrieve or receive the value from the requestor. For example, in one such embodiment, the user may have purchased an admission ticket to three museums, but did not specify at the time of purchase which of a larger number of museums the user will visit. The user may then visit a museum and scan a barcode or other identifier on the ticket via an automated gate, kiosk, customer service computing device, or other device. The device may transmit a request to validate the ticket to the validation system. In some embodiments, the device may transmit an identifier of the location, such as the museum name, address, or an identifier associated with the location. In some embodiments, the device may transmit the identifier responsive to a request for the identifier from the validation system.

Based on the set value or values for the at least one unspecified term or terms, at step 530, the validation system may determine if the order is valid. Determining if the order is valid may comprise searching a hierarchical tree for a leaf corresponding to one or more values specified by the user at the time of purchase and identified in the request or the purchase record, and corresponding to the set value or values for the at least one unspecified term or terms not specified by the user at the time of purchase. As discussed above, once every required term is specified or set, either (i) no leaves will correspond to the specified or set values or (ii) a single leaf will correspond to the specified or set values. Accordingly, the validation system will be able to determine, respectively, that the order is (i) not valid, or (ii) is valid.

At step 532, the validation system may transmit a validation response, responsive to the determination. In some embodiments, transmitting a validation response may comprise transmitting a response indicating the order is not valid. In a further embodiment, the response may indicate a variable that must be changed to be valid, such as a future time of entry when the order will become valid. In other embodiments, transmitting a validation response may comprise transmitting a response indicating the order is valid. In a further embodiment, the response may indicate to allow access to an attraction or event or other location. For example, in one embodiment in which the order is for an airline ticket, the response may indicate that the purchaser may board the aircraft.

At step 534, in some embodiments in which the order is determined to be valid, the validation system may identify the net price in the leaf or contract corresponding to one or more values specified by the user at the time of purchase and identified in the request or the purchase record, and corresponding to the set value or values for the at least one unspecified term or terms not specified by the user at the time of purchase. At step 536, in some embodiments, the validation system may initiate payment of the identified net price to the vendor of the item for which the order was validated. In some embodiments, initiating payment may comprise directing an accounts payable or payment system to initiate payment to the vendor. In other embodiments, initiating payment may comprise adding an indicator of the net price due to a payment record for the vendor, such that a future payment may include payment of the net price for the item. Payment may be completed immediately, or at a predetermined or periodic future time.

Figure 5C:
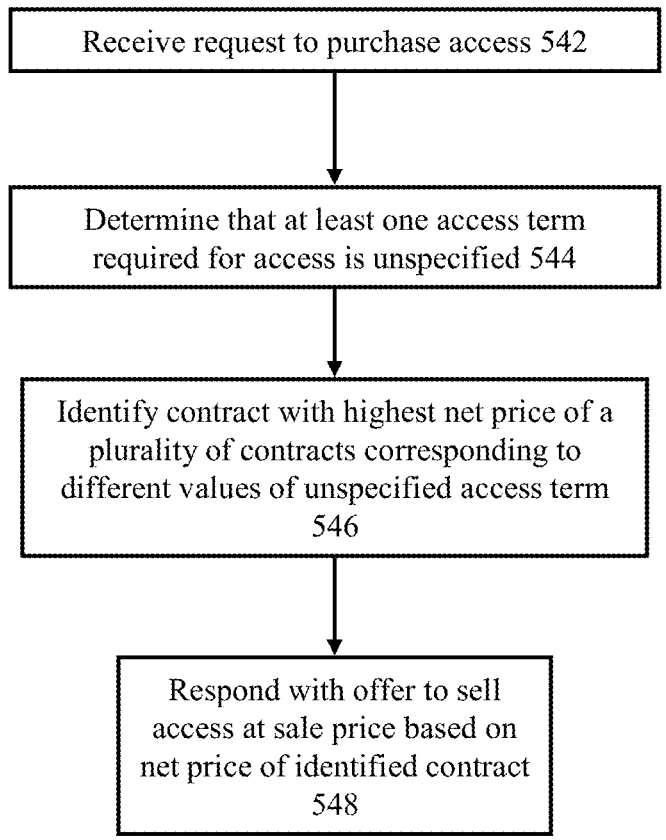
FIG. 5C is a flow chart of an embodiment of a method of selling an access token with an unspecified term.

Referring now to FIG. 5C, illustrated is a flow chart of an embodiment of a method 540 of selling an access token or ticket with an unspecified term. At step 542, the server or dynamic pricing system may receive a request to purchase an access ticket or token to an event, attraction, venue, transportation service, remote application, cloud computing service, or any other similar service, location, or occurrence. The request may be received using any of the methods or systems discussed herein. In some embodiments, the request may comprise an API request, a data request, a submitted query form such as an HTML GET or POST request, or any other type and form of request. In some embodiments, the request may be received via a network communication from a computing device used by the user, such as a desktop computer, laptop computer, tablet computer, smartphone, or other device. In some such embodiments, the request may be made through a web application or form, while in other such embodiments, the request may be made through a dedicated application. In some embodiments, the request may specify a first one or more access terms, such as a ticket class, type, time, date, day, month, duration, or any other access term. In many embodiments, the request may not specify a second one or more access terms. The second one or more access terms may be required to be fixed, specified, or otherwise established in order to allow access, such as any of the terms mentioned above. Terms may be fixed explicitly, such as the purchaser specifying a value of the term at time of fulfillment of the order, or terms may be fixed implicitly, such as a timestamp or date of access.

At step 544, the dynamic pricing system may determine that at least one term required for access is unspecified, such as an access time or date. In some embodiments, the request may explicitly identify that at least one required access term is unspecified. In other embodiments, the dynamic pricing engine may inspect the request to identify that a required access term is missing or unspecified. In still other embodiments, the dynamic pricing engine may search a hierarchical tree for a leaf or contract corresponding to the request using one or more access terms specified in the request. In one such embodiment, if the dynamic pricing engine only finds a single leaf corresponding to the access terms specified in the request, then no additional access terms are required to be specified. Conversely, if the dynamic pricing engine finds a plurality of leaves or contracts corresponding to the access terms specified in the request, then any access terms with values that vary between the leaves may be required to be specified for the order to be fulfilled. Searching the hierarchical tree may be performed using any search algorithm.

At step 546, the dynamic pricing system may identify a contract or leaf with a highest net price of a plurality of contracts or leaves corresponding to different values of the unspecified at least one access term. In some embodiments, identifying the leaf with the highest net price may comprise comparing each net price of a plurality of leaves to determine the leaf with the highest net price. In some embodiments, the highest net price may be shared by multiple leaves with the same net price. In such embodiments, the dynamic pricing engine may identify either leaf, or may otherwise retrieve the net price from either leaf.

At step 548, the dynamic pricing system may respond with an offer to sell the access ticket or token at a sale price based on the net price of the identified contract or leaf. In other embodiments, the dynamic pricing engine may respond to the request with an offer to sell the access ticket or token at a sale price based on the highest net price identified in the plurality of contracts. In many embodiments, the sale price may be determined according to method 420, discussed above.

Figure 5D:
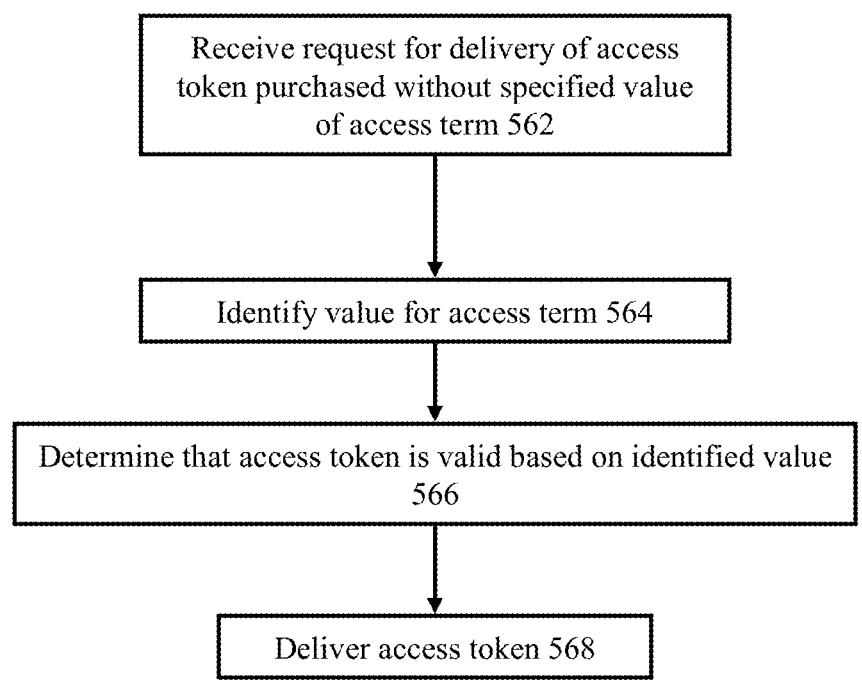
FIG. 5D is a flow chart of an embodiment of a method of delivering an access token with an unspecified term.

Referring briefly to FIG. 5D, illustrated is a flow chart of an embodiment of a method 560 of delivering an access token purchased with an unspecified term. For example, the access token may comprise a cookie, token, certificate, password, or other identifier allowing access to a service, such as a cloud computing service, web application, remote server, or other service. In other embodiments, the access token may comprise a message indicating that a purchaser should be allowed access to something. For example, the access token may be a message sent to unlock an automatic gate, indicate to an agent that the purchaser should be allowed to pass, or otherwise allow access. Accordingly, the access provided when the access token is delivered may be physical or virtual access. Similar to the unspecified terms in the methods discussed above, the unspecified term may be a term that is required for access, such as a time of access or day of access.

At step 562, an access validation system may receive a request for delivery of an access token purchased without a specified value for one or more access terms. In some embodiments, the request may explicitly identify the one or more unspecified access terms, while in other embodiments, the request may be silent regarding the unspecified access terms. In a further embodiment, the request may include a unique identifier. The access validation system may use the unique identifier to retrieve an associated purchase record from a purchase database, the purchase record identifying the one or more unspecified access terms.

At step 564, the access validation system may identify a value for the one or more unspecified access terms. In some embodiments, identifying a value may comprise retrieving a value for the term, such as a timestamp value, a date value, a day value, an account balance, or a counter value. In other embodiments, identifying a value may comprise identifying a value included in the request. For example, in one such embodiment, the request may indicate that the access token was previously purchased without a time of entry, and may further include a desired access time or a current time at which access is being attempted or validation is being requested.

At step 566, the access validation system may determine whether the access token is valid, based on the identified value or values for the one or more access terms. As discussed above, determining whether the access token is valid may comprise searching a hierarchical tree for a leaf corresponding to the identified value or values for the one or more access terms. The leaf may further correspond to one or more access terms that were specified at time of purchase. If no leaf is found, then in some embodiments, the validation system may respond to the request indicating that the access token is invalid. In a further embodiment, the validation system may indicate a value or values for the one or more unspecified access terms that may be required for the token to be valid, such as a time at which the token is valid or a minimum account balance.

If a leaf is found, the validation system may determine the access token is valid. Responsive to the determination, at step 568, the access validation system may deliver the requested access token. In some embodiments, delivering the access token may comprise transmitting a token, cookie, password, pass code, certificate, string, or other data to the requestor or a third party. In other embodiments, delivering the access token may comprise indicating to an agent that the requestor should be granted access.

In some embodiments, the access and validation system may provide variable tickets, allowing consumers to pre-purchase access to an attraction without necessarily identifying the attraction. For example, in one embodiment, a consumer may purchase an access ticket for x of y attractions, such as any 3 of 5 predetermined attractions, or an access ticket that allows access to a museum and one of either of a planetarium or an iMAX theater. Thus, in one embodiment of method 560, an attraction name or identification may be an unspecified access term at time of purchase. The validation system may identify, for example, that the attraction is one of the attractions predefined for the consumer's variable access ticket, and may provide an access token and decrement a value associated with the customer ticket or account. This may be particularly valuable for tourists who may determine that they want to visit a number of attractions in a city, but do not want to be tied to specific selected attractions at time of purchase.

D. Systems and Methods for Dynamic Pricing of an Extended Order or Offer

As discussed above, in many embodiments, the systems and methods described herein may be used to provide discounted pricing to an order comprising a plurality of items, and may determine a sale price for a consumer that is balanced against one or more business margin thresholds of the dynamic pricing system operator. In a further embodiment, discounted pricing may be extended to orders or offers purchased or accepted after the initial purchase, and in some cases, after the order or offer has been fulfilled or access granted based on the order. For example, as discussed above, in some embodiments a user may request to purchase a ticket for access to three attractions, such as museums, clubs, or similar events. Using the dynamic pricing system to balance net prices for each attraction with overall business thresholds, along with optional volume discounts, a discounted sale price may be determined for a ticket allowing access to all three attractions. The user may visit one or more of the museums, and then decide that they wish to add an additional attraction to the ticket. If the user simply purchases a new ticket for the single attraction, volume discounts can not be applied because there is only one item in the order, and a business margin can not take advantage of greater margins on individual items in the order to provide further discounts to the user. However, by having the new purchase relate back to the original purchase, as if it were made at the same time, the sale price for the ticket may be dynamically recalculated, and a cost difference identified for the user to pay to add the additional item. This may result in increased discounts, as well as providing the user with greater flexibility.

Furthermore, extending dynamic pricing may allow for upselling or cross-selling opportunities. For example, a user who purchased a lift ticket to a ski resort may arrive and realize that they've forgotten their skis, or need new gloves, or wish to purchase a day pass for a spa. The user may be further encouraged to make a new purchase or rental if they can add these items to the previously-purchased order of the lift ticket, to take advantage of volume discounts and discounts responsive to business margin thresholds.

Similarly, in some embodiments, offers to purchase items using an extended dynamic pricing incorporating a previously purchased item or items may be sent to the user. The offers may be responsive to a purchase history or history of similar purchases by other users. For example, if users who purchase a first item, such as a ticket to a football game, frequently purchase a second item, such as a pre-paid parking pass, pre-paid concessions, a ticket to a later game, a team jersey, or other items, offers to purchase these items using extended dynamic pricing may be provided to purchasers of the first item.

In other embodiments, up-selling or cross-selling opportunities may be provided based on a location. For example, when a user purchases access to a first attraction, an offer may be provided to purchase access to nearby attractions using extended dynamic pricing. In some embodiments, the offer may be extended to the user when they access the first attraction. For instance, in one such embodiment in which a city tour departure point is next to a local attraction, such as an aquarium, when a user who has purchased access to the aquarium uses their ticket, an offer may be provided to the user to immediately purchase a ticket to the nearby tour at a discounted price that incorporates volume discounting and net price balancing from their previous purchase of the aquarium ticket. In another embodiment, a location service of a mobile computing device may be used to detect a user location, and offers to purchase tickets to an attraction at an extended discount price may be transmitted to the user's mobile computing device when the user is in proximity to the attraction.

Accordingly, in many embodiments in which a user purchases an access ticket to one or more attractions, events, services, or similar items, the user may provided with a single ticket, while retaining the flexibility to add additional attractions, events, services or similar items to the ticket. In some embodiments, the user may even remove previously purchased items from the ticket and receive a credit or refund for the price difference, or replace previously purchased items from the ticket with new items. Accordingly, a single ticket may be used for access to multiple venues. In some embodiments, the ticket may comprise a card or pass encoded with magnetic or optical data or a smartcard or radio-frequency identification (RFID) card or pass encoded with data that uniquely identifies the ticket. In other embodiments, the ticket may comprise a bar code or data code delivered to the user electronically, such as via an email or application. In a further embodiment, the ticket may be retrieved or the code may be displayed on a mobile computing device, such as a smartphone, for reading by an optical scanner. In one embodiment, the ticket may include an expiration date or term that the user can add or remove purchases from the ticket, or a period during which any purchased access must be used. This may be done for accounting purposes so that revenue may be realized. In one such embodiment, the expiration date or term may be a month, six months, a year, or any other period, and may be calculated from the date of first purchase, the date of first access, or any other time period.

Figure 6:
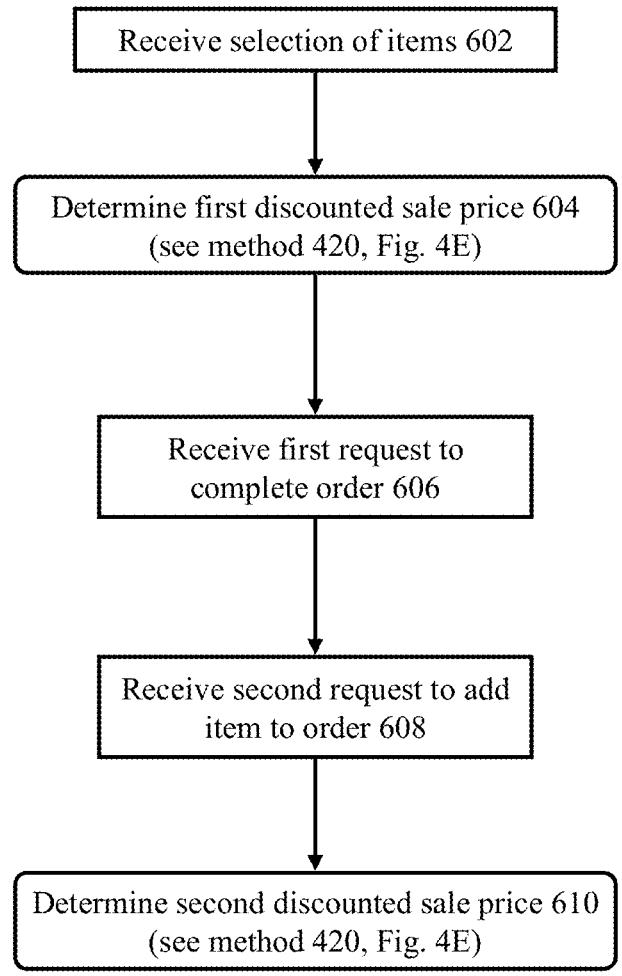
FIG. 6 is a flow chart of an embodiment of a method of extending discounted pricing of an order to items added to the order after purchase of the order.
Figure 6:

Referring now to FIG. 6, illustrated is a flow chart of an embodiment of a method 600 of extending discounted pricing of an order to items added to the order after purchase of the order. In brief overview, at step 602, a dynamic pricing system may receive a selection of one or more items to be purchased by a user. At step 604, the dynamic pricing system may determine a first discounted sale price to purchase the selected one or more items. At step 606, the dynamic pricing system may receive a first request to complete the order. At step 608, the dynamic pricing system may receive a second request to add an item to the order. At step 610, the dynamic pricing system may determine a second discounted sale price for the order.

Still referring to FIG. 6 and in more detail, at step 602, the dynamic pricing system may receive a selection of a first one or more items to be purchased by a user. In some embodiments, receiving the selection of the first one or more items may comprise receiving a request to purchase the first one or more items, as discussed above. At step 604, the dynamic pricing system may determine a first discounted sale price for the first one or more items. In many embodiments, determining the first discounted sale price may comprise performing an embodiment of method 420, discussed above.

At step 606, the dynamic pricing system may receive a first request to complete the order at the first discounted sale price. In some embodiments, and responsive to the first request, the dynamic pricing system may complete the order at the first discounted sale price. Completing the order may comprise completing a purchase transaction, charging the user, billing the user, and/or delivering the one or more items as discussed above. In many embodiments, the order may be completed or purchased, but not yet fulfilled. For example, as discussed above, in embodiments in which the item is delivered at a future date or is access to an attraction or service, the order may be completed by charging the user, even though the user has not yet accessed the attraction or the item has not yet been fulfilled.

At a subsequent time, the dynamic pricing system may receive a second request to add a second one or more items to the order at step 608. In some embodiments, the second request may be generated or initiated by the user. In other embodiments, such as where the system identifies a possible up-sell or cross-sell opportunity, the second request may be generated or initiated by the dynamic pricing system. In some embodiments, the second one or more items may be determined responsive to a location of the user, such as a location determined via a mobile computing device or determined when the user accesses an attraction at a known location. In other embodiments, the second one or more items may be determined responsive to selections or purchases made by other users who also selected the first one or more items.

In many embodiments, the subsequent time may be after the user has received, accessed, or otherwise utilized one or more of the first one or more items. For example, the subsequent time may be after the user has used an access ticket to an attraction that was selected as one of the first one or more items, or the subsequent time may be after the user has received a book that was one of the first one or more items. In other embodiments, the subsequent time may be after the user has been billed or has paid for the order at step 606.

At step 610, the dynamic pricing system may determine a second discounted sale price. In some embodiments, determining the second discounted sale price may comprise retrieving a purchase record of the order including the first one or more items. The dynamic pricing system may determine the second discounted sale price based on a purchase of the first one or more items and the second one or more items, using any of the embodiments of method 420 discussed above. The second discounted sale price may comprise a sale price for the first one or more items and the second one or more items, minus the first discounted sale price. Accordingly, the second discounted sale price may represent a difference between the sale price for the first one or more items already paid by the user, and the sale price for the first one or more items and the second one or more items. In some embodiments, the dynamic pricing system may present to the user an offer to purchase the second one or more items at the second discounted sale price.

As discussed above, in some embodiments, the items may comprise goods such as books, clothing, software, electronic items, electronic books, toys, gift certificates, or other tangible or intangible goods. In other embodiments, the items may comprise admissions to events such as concerts or theater shows, attractions such as museums or amusement parks, or services, such as tours, travel tickets, restaurant reservations, or other similar services or attractions.

Figure 7:
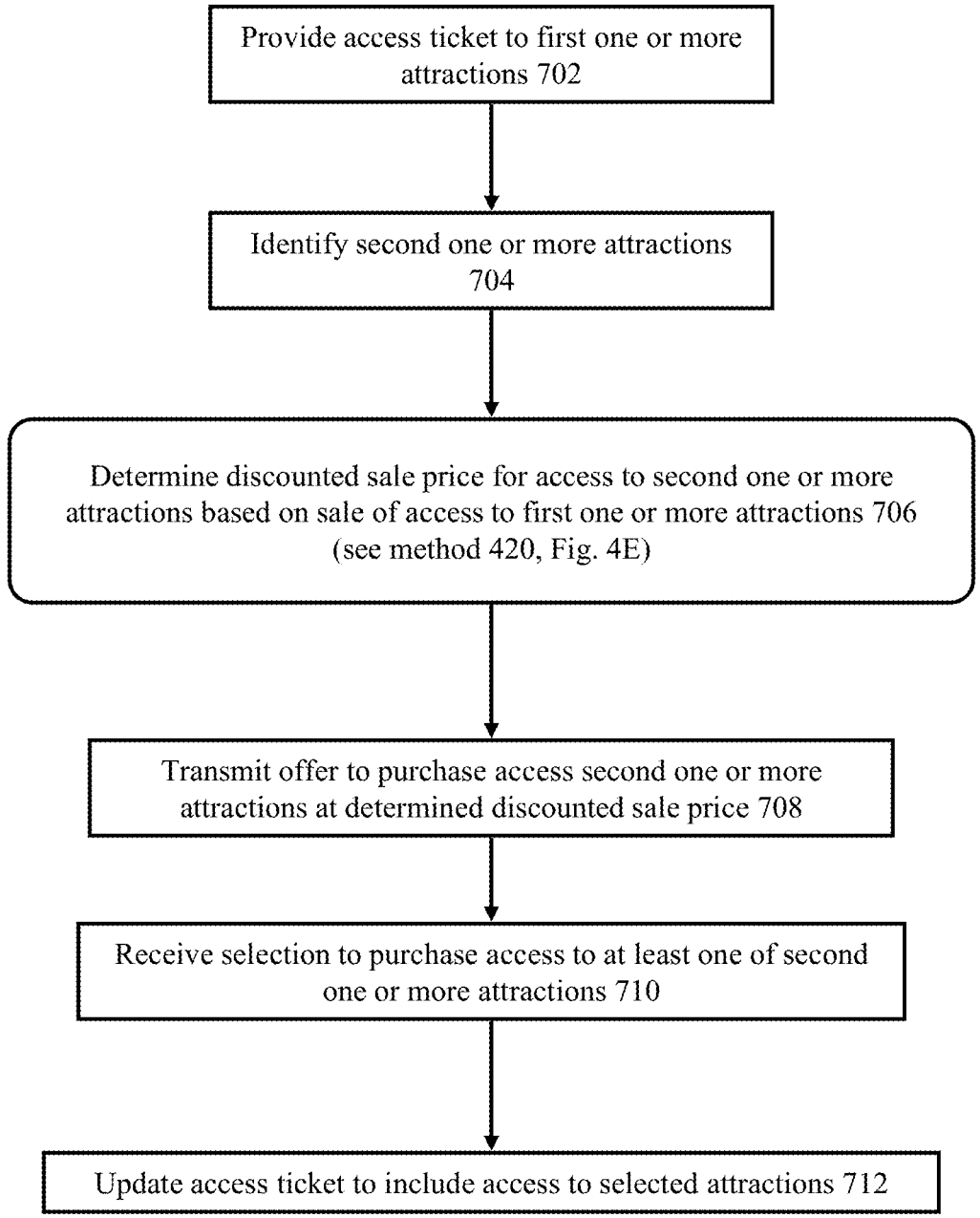
FIG. 7 is a flow chart of an embodiment of a method of offering a new attraction to add to an access ticket.

Illustrated in FIG. 7 is a flow chart of an embodiment of a method 700 of offering a new attraction to add to an access ticket. In brief overview, at step 702, a dynamic pricing system may provide an access ticket to a first one or more attractions. At step 704, a second one or more attractions may be identified. At step 706, a discounted sale price for access to the second one or more attractions may be determined, based on the sale price or retail and net prices of access to the first one or more attractions. At step 708, an offer to purchase access to the second one or more attractions at the determined discounted sale price may be transmitted to the user or consumer. At step 710, the dynamic pricing system may receive a selection to purchase access to at least one of the second one or more attractions. At step 712, the access ticket may be updated to include access to the selected attractions.

Still referring to FIG. 7 and in more detail, at step 702, a dynamic pricing system may provide an access ticket to a first one or more attractions. As discussed above, the access ticket may comprise a card, smartcard, or electronic ticket, or any other type and form of access ticket. The access ticket may be provided responsive to the user purchasing access to the first one or more attractions, as discussed above.

At step 704, a second one or more attractions may be identified. In one embodiment, the dynamic pricing system or a sales engine may identify the second one or more attractions. In some embodiments, such identification may be responsive to other users who purchased access to the first one or more attractions also purchasing access to the second one or more attractions, or such identification may be responsive to geographical proximity, attraction similarity, or any other similar characteristics. In other embodiments, such identification may be responsive to the user accessing an attraction of the first one or more attractions that is in geographical proximity to an attraction in the second one or more attractions. In another embodiment, the purchaser of the access ticket may identify a second one or more attractions. The identification may be performed at a time subsequent to when the purchaser was provided with the access ticket to the first one or more attractions.

At step 706, the dynamic pricing engine may determine a discounted sale price for access to the second one or more attractions. Determining the discounted sale price may comprise retrieving a purchase record for the previously purchased access ticket, and/or retrieving a previous sale price paid by the purchaser or user. The discounted sale price may be based on the sale price, or net prices and retail prices of the first one or more attractions, as well as the net prices and retail prices of the second one or more attractions. The discounted sale price may be determined using any of the embodiments of method 420, discussed above. In many embodiments, the discounted sale price may comprise a difference between a previously paid purchase price for the access ticket and a sale price determined via method 420. Accordingly, the discounted sale price may comprise a price to add access to the second one or more attractions to the access ticket.

At step 708, an offer to purchase access to the second one or more attractions at the determined discounted sale price may be provided to the purchaser or user. In many embodiments, the offer may be delivered via an email, text message, voice message, application alert, popup message, or other means. In a further embodiment, the offer may indicate the discounted sale price, as well as a non-discounted or full retail price of access to the second one or more attractions, to show the potential savings by the user.

At step 710, the dynamic pricing system may receive a selection from the purchaser or user to purchase access to at least one of the second one or more attractions. In some embodiments in which the user or purchaser selects purchase of all of the second one or more attractions, the user or purchaser may be charged the determined discounted sale price. In other embodiments in which the user or purchaser selects fewer than all of the second one or more attractions, the dynamic pricing system may re-determine the discounted sale price based on the selected at least one of the second one or more attractions.

At step 712, the dynamic pricing system may update the access ticket to include access to the selected at least one of the second one or more attractions. In some embodiments, updating the access ticket may comprise updating a purchase record associated with the access ticket. For example, in embodiments where the access ticket is delivered to the user as a bar code or data code or other unique identifier, the dynamic pricing system may update a purchase record associated with the unique identifier to indicate that the user has purchased access to the selected at least one of the second one or more attractions. In some embodiments, the dynamic pricing system may further charge the user the discounted sale price. Charging the user may comprise deducting the discounted sale price from a stored user credit, such as where the user has removed a previously purchased item from an order. In other embodiments, charging the user may comprise charging a user's credit card, billing the user, or otherwise receiving payment from the user.

Figure 8A:
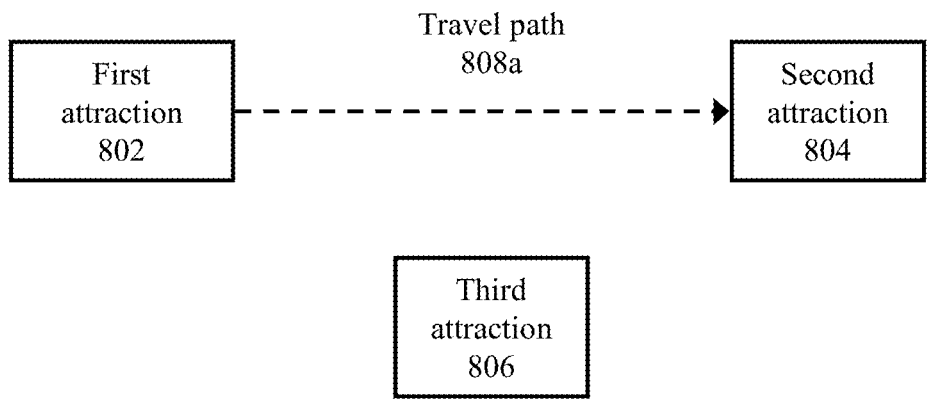
FIGS. 8A and 8B are block diagrams illustrating embodiments of travel paths between a first and second attraction, sometimes via a third attraction.

E. Systems and Methods for Providing Enhanced Data Collection and Reporting for Improved Ticket Pricing and Marketing In some embodiments of access systems for attractions, an access control system, such as a gate, turnstyle, kiosk, point-of-sale system, card scanner, terminal, or other system providing access verification and entrance control, can report that a specific user entered the attraction at a specific time to a central database or administration system. In other embodiments, this data may be recorded by a centralized authentication system. Because users or customers may visit multiple attractions, it may be desirable to aggregate this data to determine pathing between attractions. For example, referring briefly to FIG. 8A, multiple attractions 802-806 may exist in local geographic area. For example, a museum may be located near a tour bus departure area, a popular restaurant, a shopping area, or other attractions. The geographic area may be a city, metropolitan area, or subsection of a city. Accordingly, users may walk, drive, or take public or private transportation between attractions.

For marketing or other business purposes, as well as providing enhanced dynamic pricing, it may be desirable to generate reports indicating that a user entered a first attraction 802, followed by a second attraction 804, either within a predetermined time period (such as an hour, a few hours, or a day) or simply prior to entering any other system-controlled attraction. For example, if many customers who enter a first attraction 802 are likely to also enter a second attraction 804 within a day, discounts for access to both attractions may be determined and/or offered to potential customers.

Many access systems may only provide details when a user enters an attraction (e.g. dunks a smartcard, provides a ticket to be scanned for entry, etc.). While these systems can provide orders and times of entry, they cannot determine accurately how long the customer remains at the attraction (sometimes referred to as "dwell time") or what travel path they took to reach the next attraction. Accordingly, in some embodiments of the systems and methods disclosed herein, enhanced location-based reporting may be provided to the centralized access system. For example, in one embodiment, a user may use a smartphone for access to an attraction. The smartphone may include capabilities for location-based services, including GPS and/or cellular or wifi-based triangulation. The location data may be stored along with timestamps creating a highly detailed travel pathing map of the user. This data may be parsed to determine dwell time at a location (e.g. when the user's position doesn't change more than a specified amount for a period of time), as well as identifying travel paths between attractions. Other devices capable of determining and reporting location may be similarly employed, including GPS devices, laptops, tablets, non-smart phones that are still capable of cellular triangulation or tower identification reporting, or other devices.

Figure 8B:
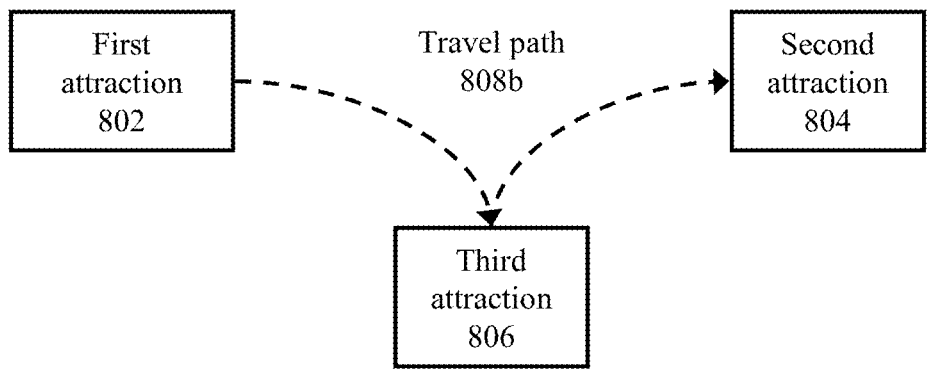

This data may then be used to provide enhanced marketing or dynamic pricing. For example, referring briefly to FIG. 8A, if it can be determined that many customers travel along a path 808a from a first attraction 802 to a second attraction 804 past a third attraction 806, a discount may be provided for the third attraction 806 to entice customers to stop, as shown in FIG. 8B and travel path 808b. For example, in one embodiment in which customers typically walk from a local museum 802 to a shopping area 804 past a well-known pastry shop, a discount or coupon may be provided to encourage customers to stop. The coupon may represent an added value for customers at little or no cost to the system operator if, for example, the shop owner is willing to subsidize the discount in exchange for the increased business.

Furthermore, in embodiments in which tickets to attractions are provided on a time-period basis, such as a one-day or three-day pass, it may be desirable for the system operator to encourage users to visit certain attractions over others. For example, one attraction, such as third attraction 806, may be low-cost or free to the system operator, such as a public park or garden, local shopping area, area where street performers typically gather, or other attractions with a high business margin or profit for the system operator after paying a net price to the attraction operator. Customers may also typically visit these attractions for a long period of time. Other attractions, such as first attraction 802 and second attraction 804, may be high-cost attractions with a low business margin or small or negligible profit for the system operator after paying a net price to the attraction operator. For example, a museum with a high net price may represent a very small profit for the system operator, while a restaurant may subsidize customer discounts in exchange for increased business, and thus represent either a large profit or no cost for the system operator, depending on whether the operator charges for the discount coupon.

In a time-period basis scenario, such as a one-day or multi-day pass, if a second attraction 804 is a high cost attraction and a third attraction 806 is a low or no cost attraction, it may be useful to encourage customers to visit the third attraction 806 on their way from the first attraction 802 to the second attraction 804, as shown in FIG. 8B. In many instances, if customers spend a sufficient time at the first attraction 802 and third attraction 806, they may not have enough time to visit the second attraction 804 within the time period, using up a day of their pass or letting it expire. The third attraction 806 thus becomes a customer "distraction," increasing profit for the system operator. By analyzing typical customer travel paths between high-cost attractions, it may be possible to identify distractions that the customers may be encouraged to visit through coupons, discounts, advertising, or other features.

The report aggregation and analysis need not be limited to entry times and location sensing. By integrating with various point-of-sale or billing systems at an attraction, additional data may be obtained that may be cross-referenced with customer information. For example, purchase information for customers who use the same credit card in a museum gift shop that they used to purchase a ticket used for accessing the museum may be aggregated to analyze typical purchase characteristics and provide targeted discounts, offers, or advertisements. Data may be further aggregated across the system, to identify typical purchase habits of customers overall. For example, through the systems and methods discussed herein, it may be determined that customers who visit a first attraction in the morning are likely to arrive at a second attraction in time for lunch, and are likely to purchase food at a restaurant or concession stand within the second attraction. Accordingly, a meal coupon may be provided to customers attending the first attraction to further encourage them to visit the second attraction, rather than an unassociated restaurant along the travel path. In other embodiments, point-of-sale data for an attraction may be used to identify what percentage of customers use pre-paid tickets or passes as opposed to those purchasing tickets on-site, which may be valuable for business margin analysis and marketing to the attraction.

Figure 8C:
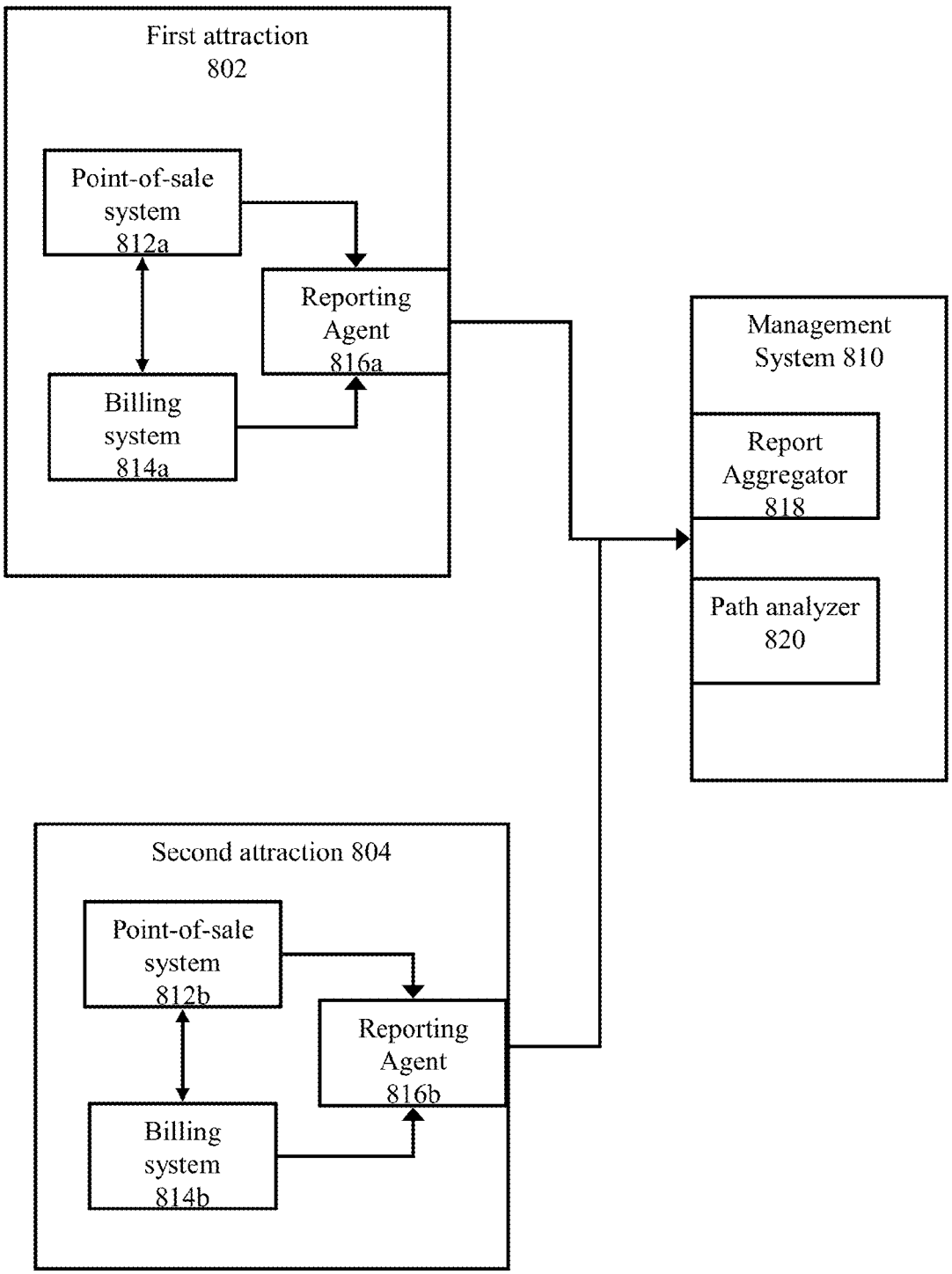
FIG. 8C is a block diagram illustrating another embodiment of a system for enhanced reporting, incorporating third party data source aggregation.

Referring now to FIG. 8C, illustrated is a block diagram of another embodiment of a system for enhanced reporting, incorporating third party data source aggregation. In brief overview, a management system 810, which may comprise a server of a dynamic pricing system operator, includes a report aggregator 818 and/or a path analyzer 820. Although illustrated within a single management system 810, report aggregator 818 and path analyzer 820 may be provided by one or more servers in communication.

Report aggregator 818 may comprise an application, server, daemon, service, or other executable code for receiving or retrieving and aggregating data from a plurality of reporting agents 816a-816b (referred to generally as reporting agents 816) at one or more attractions. Reporting agents 816 may similarly comprise applications, servers, daemons, services, clients, or other executable code for aggregating data from point-of-sale systems 812a-812b (referred to generally as point-of-sale systems 812) and/or billing systems 814a-814b (referred to generally as billing systems 814). and transmitting said data to the report aggregator 818. Point-of-sale systems 812 and billing systems 814 may comprise cashier terminals, ticket kiosks, credit card readers, or any other type and form of system for transacting sales with customers.

In some embodiments, report aggregator 818 may generate reports of user or customer-specific data, attraction-specific data, city-specific data, or data filtered by any other characteristic, such as customers who visit a first attraction and then a second attraction, or customers who visit a third attraction and purchase goods while there.

In some embodiments, a management system 810 or a dynamic pricing system as discussed above may comprise a path analyzer 820. Path analyzer 820 may comprise an application, service, server, daemon, routine, or other executable logic for determining a path between a first attraction 802 and a second attraction 804, and identifying a third attraction based on the determined path. For example, in one embodiment, path analyzer 820 may identify a third attraction within a predetermined distance from the travel path between the first attraction 802 and the second attraction 804. In another embodiment, path analyzer 820 may rank a plurality of attractions within a predetermined distance from the travel path based on a net price associated with each of the plurality of attractions, such that path analyzer 820 may select a high-profit, low net-price third attraction. In another similar embodiment, path analyzer 820 may rank a plurality of attractions within a predetermined distance from the travel path based on a dwell time, or an average time that users stay at the attraction. This may be determined based on entry/exit times, information provided by the attraction operator, or any other data.

In some embodiments, the path analyzer 820 may determine travel path based on map data, such as that provided by third party providers such as Google Maps, provided by Google, Inc., or Bing Maps, provided by Microsoft, Inc., or any other such providers. Furthermore, although discussed above in connection to physical attractions such as museums or parks, the same concepts can be applied to non-physical attractions such as websites or cloud services. Similar to monitoring physical pathing between attractions, a customer's virtual path between services, web pages, or other attractions may be tracked to determine order of visitation, dwell time, and whether additional third-party services are purchased. This data may be used for enhanced reporting for marketing purposes, better calculating business margins, and providing targeted coupons and discounts to customers.

Figure 8D:
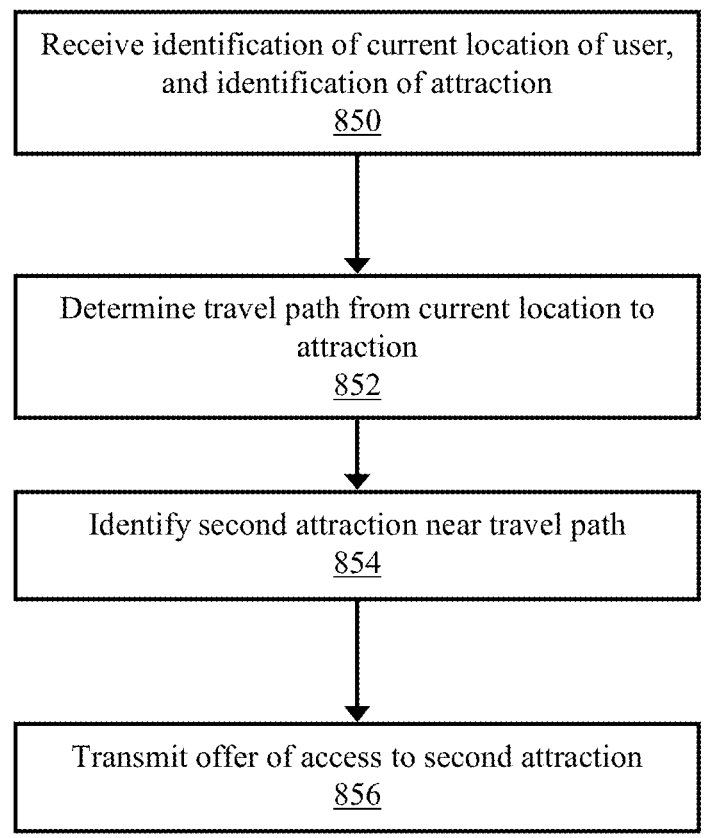
FIG. 8D is a flow chart of an embodiment of a method for enhanced marketing responsive to customer path data.

Referring now to FIG. 8D, illustrated is a flow chart of an embodiment of a method for providing enhanced marketing or up-selling opportunities responsive to customer location and/or path data between attractions. In brief overview, at step 850, a device, such as a server of a dynamic pricing system operator or other computing device as discussed above, may receive an identification of a location of a user and a first attraction selected for access by a user. At step 852, a path analyzer of the device may determine a travel path from the user location to the first attraction. At step 854, the path analyzer may identify a second attraction near the travel path. At step 856, the device may transmit an offer of access to the second attraction to a computing device of the user. Still referring to FIG. 8D and in more detail, at step 850, a device may receive an identification of a location of a user and a first attraction selected for access by the user. In some embodiments, the location may be a current location of the user. For example, in one embodiment, the user may access a third attraction, and the identification of access may be provided to the device, indicating the user is at the location of the third attraction. Thus, in many such embodiments, the "first" attraction may be an attraction visited chronologically after the "third" attraction. Accordingly, one of skill in the art may appreciate that these identifiers may be used to distinguish attractions rather than imply an order. In another embodiment, the device may receive location data from a computing device of the user, such as GPS, cellular, or WiFi location services of a smart phone of the user. In other embodiments, the location may be a future location of the user. For example, the user may be purchasing an access ticket and selecting attractions to visit. The device may receive a selection of a first attraction and identify the location of the first attraction as a "user location" at which the user will be in the future. This may be useful for suggesting up-sell opportunities during purchase, based on travel paths between attractions selected by the user during purchasing. In some embodiments, the device may receive the identification of the user location from a smart phone or other computing device of the user, while in other embodiments, the device may receive the identification of the user location from an access control at the attraction, such as a gate system, ticket verification system, point-of-sale system, or other such system.

At step 852, in some embodiments, a path analyzer executed by the device may determine a travel path between the location of the user and the first attraction selected for access. In some embodiments, the path analyzer may transmit a request for directions to a third party mapping service provider, while in other embodiments, the path analyzer may include predefined paths, saved paths from prior requests, or may communicate with a map database provided by the device. The travel path may be via foot, car, bicycle, public transportation, ferry, or any other travel means. In some embodiments, the path analyzer may determine a plurality of paths via different travel means. For example, in one embodiment, the path analyzer may determine a first travel path if the user walks from the location to the first attraction, or a second travel path if the user takes public transportation from the location to the first attraction. This may provide for different up-sell opportunities, based on user preferences of travel. In still other embodiments in which the attractions are virtual, the path analyzer may determine a typical series of links between web pages or selections for a user to travel from one virtual attraction to another virtual attraction.

At step 854, the path analyzer may identify a second attraction within a predetermined distance from the travel path. In one embodiment, the path analyzer may identify attractions based on a lateral distance from any point on the travel path between the location and the first attraction, or the shortest length of a line from the identified attraction to the travel path, orthogonal to the path. In some embodiments, the travel path may be expanded to a predetermined width or radius, and attractions within the expanded boundaries may be identified. In other embodiments, the path analyzer may search within an area defined by overlapping circles centered on the user location and the first attraction, with radiuses equal to the distance between the user location and the first attraction. This may define an ovoid or somewhat diamond-shaped region in which any point may be considered to be at least partly "on the way" to the first attraction.

In some embodiments, the path analyzer may identify just a single second attraction. In other embodiments, the path analyzer may identify a plurality of attractions and may select an attraction to be the second attraction, based on characteristics of the attraction. For example, a plurality of attractions may be located within the predefined distance to the path, overlapping regions, or similar areas. In some embodiments, the path analyzer may identify one or more attractions responsive to a net price of the attraction being below a predetermined threshold. Such attractions may be low-cost attractions for the dynamic system operator, as discussed above. In other embodiments, the path analyzer may identify one or more attractions based on an average customer visit time or dwell time being above a predetermined threshold. As discussed above, in some embodiments in which a user's access ticket is time-limited, such as a day pass, directing the user to a low net price, long dwell time attraction or "distraction" may result in the user not arriving at the first attraction with sufficient time to visit, or arriving after a closing time or expiration of their day pass. If the first attraction is a high net price attraction, not having to pay the attraction the net price if the user fails to arrive in time may result in a significant realized profit for the dynamic system operator, similar to accounting "breakage". Thus, in one embodiment, the time threshold may be set to a time until expiration of the access ticket or until closure of the first attraction.

At step 856, the device or a dynamic pricing system may transmit an offer of access to the identified second attraction to a computing device of the user. In some embodiments, the offer may comprise an offer to add access to the identified second attraction to an access ticket of the user, as discussed above. In some embodiments, the device or dynamic pricing system may transmit an offer of access to one or more of a plurality of identified attractions, such as where several attractions are along the travel path to the first attraction. In some embodiments, the plurality of identified attractions may be ranked by distance, price, net price, dwell time, or any other value. In some embodiments, a management system executed by the device may transmit a request to a dynamic pricing system to transmit the offer to the user, using any of the systems and methods discussed above.

In some embodiments, the method of FIG. 8D may be repeated iteratively. For example, a user may be at a location or attraction, and the system may transmit an offer of access to a nearby attraction to the user. Responsive to the user selecting to purchase access to the nearby attraction, the system may then transmit an offer of access to another attraction along or near the travel path. In many instances, this may provide multiple up-sell opportunities. For example, a user may be at an aquarium, and responsive to receiving an identification of the user's location (e.g. entry past a gate, or via location services of a mobile computing device of the user), the device may transmit an offer to purchase a ticket to a whale watch leaving from a nearby dock. If the user accepts, the device may further transmit an offer to purchase a discount on sunglasses or binoculars at a nearby kiosk, or an offer to purchase a discounted meal at a nearby restaurant while waiting for the whale watch. Accordingly, each up-sell opportunity may provide opportunities for further up-sell opportunities, all convenient to the user.

F. Systems and Methods for Rewards-Based Models for Ticket Pricing and Marketing In some embodiments of the systems and methods discussed herein, customer rewards may be used to encourage additional use of the system or encourage customers to take other actions that increase brand visibility of the system through social marketing. Rewards may comprise discounts, coupons, merchandise, gift certificates, or any other type and form of reward. For example, in some embodiments, rewards such as coupons or additional discounts may be provided to customers, with greater discounts available as customers use the system more. In a further embodiment, the rewards may be integrated with a social networking platform, such as Facebook, manufactured by Facebook Inc. of Menlo Park, Calif. For example, as customers use the system to purchase and access attractions, the customers may earn achievement points that may be displayed on a social networking profile. In one embodiment, predetermined amounts of points may be redeemed for extra discounts, coupons, or other rewards. In another embodiment, a customer may have a "level" and advance to higher levels by earning more points. Each higher level may be associated with an additional discount, further encouraging loyalty and use.

In other embodiments, rewards may be given responsive to customer actions. For example, a customer may earn points or rewards by writing and submitting a review of an attraction to the system, getting a friend to sign-up, attending an attraction while wearing a promotional t-shirt or hat, linking to the system via a social networking site, or performing other actions. In some embodiments, rewards may be given in exchange for customer participation in a promotion, such as attending a specific attraction on a specified day. This may be desirable for attraction operators who may be willing to subsidize the rewards in exchange for additional business during a slow period.

In other embodiments, rewards may be given in exchange for customer participation in a marketing survey, or for providing additional personal details to the system operator, such as family size and ages, income level, typical vacation destinations and duration, interests, or other information that may be useful for targeted advertisements and offers. In one embodiment, the system may provide a reward to a customer in exchange for providing access to an email address book or social networking profile, allowing marketing to friends and colleagues through recommendations.

Figure 9A:
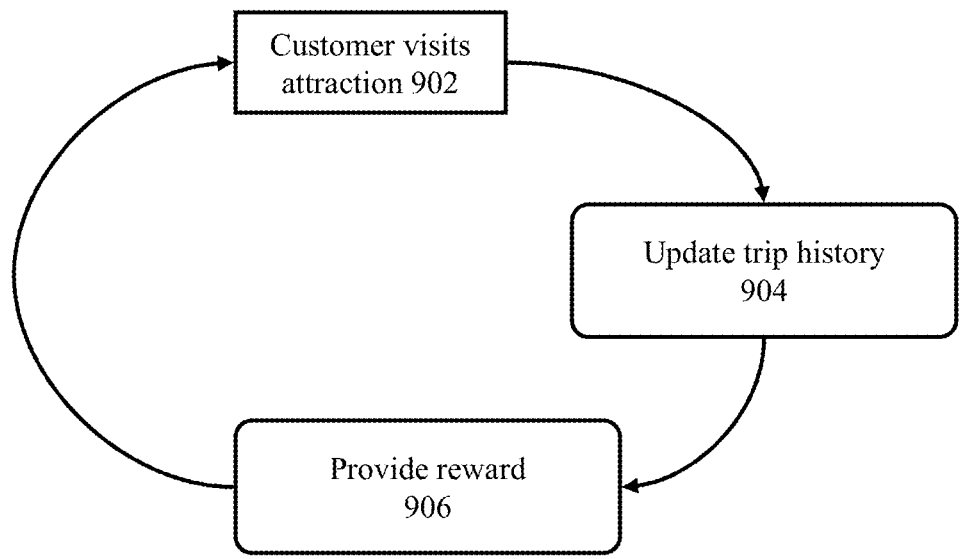
FIG. 9A is a block diagram of an embodiment of a method of providing a reward responsive to a customer history.

Illustrated in FIG. 9A is a block diagram of an embodiment of a method of providing a reward responsive to a customer history. In brief overview, at step 902, a customer may visit an attraction. The attraction may comprise a physical attraction, such as a museum, restaurant, theme park, or theater, or may comprise a virtual attraction, such as a web site, web service, cloud service, online game, or any other type and form of attraction. At step 904, the system may update a trip history responsive to the customer visiting the attraction. In one embodiment, updating the trip history may comprise posting a trip indicator to a social networking site, identifying that the customer has attended an attraction. The trip indicator may comprise a status update, wall post, Twitter message, or any other type of public or private notification. At step 906, the system may provide a reward to the customer. In some embodiments, the notification may need to be shared for the system to provide a reward to the customer, providing enhanced marketing and advertising channels. As discussed above, the reward may comprise a discount, coupon, certificate, merchandise such as a t-shirt, hat, bumper sticker, promotional mug, towel, or any other type and form of reward. In some embodiments, as discussed above, the reward may comprise achievement points or reward points added to a customer profile to allow the customer to advance through achievement or reward levels. In a further embodiment, responsive to the customer advancing a level, a further notification may be posted.

Figure 9B:
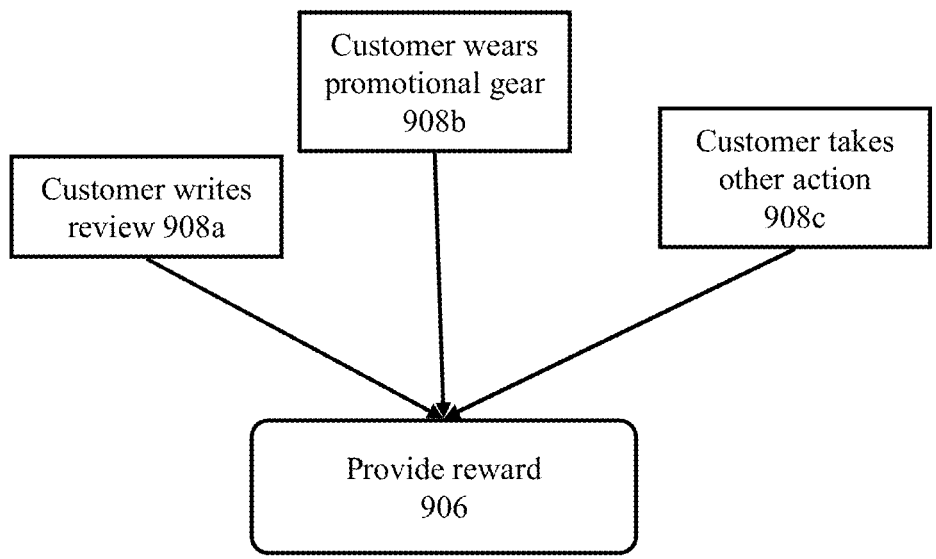
FIG. 9B is a block diagram of an embodiment of a method of providing a reward responsive to customer actions.

Referring briefly to FIG. 9B, illustrated is a block diagram of an embodiment of a method of providing a reward responsive to customer actions. In response to a customer performing an action, such as writing and submitting a review 908*a*, wearing promotional gear such as a t-shirt or hat 908*b*, or taking other actions 908*c* such as participating in a survey, inviting friends or colleagues to the system, visiting an attraction on a specified day, or other predetermined actions, a reward may be provided to the customer at step 906.

In addition to marketing and advertising purposes and allowing the customer to earn rewards, the trip history may be useful as a record of the customer's visits to the attraction for inclusion in photo albums, movies, or other memorabilia. In a further embodiment, the trip history may be used by an integration system to automatically tag photos taken by the customer. For example, if the trip history indicates that a user visited a first attraction on a certain day, with a dwell time of three hours, photos taken by the user with a digital camera or smartphone during those three hours may be automatically tagged with an identification of the attraction, eliminating the need for the user to manually sort and tag the photos. This may also be used to automatically add stock photos or images of the attraction to a user album. For example, if a user visits a museum, photos taken by the user at the museum may be automatically tagged based on the visit to the attraction. Additionally, images of the museum or particular collections within the museum may be automatically provided to the user, or provided for a fee, expanding the user's photo album. This may be particularly appreciated in instances when the user is unable to take pictures due to policies of the attraction, and may increase customer loyalty.

Figure 9C:
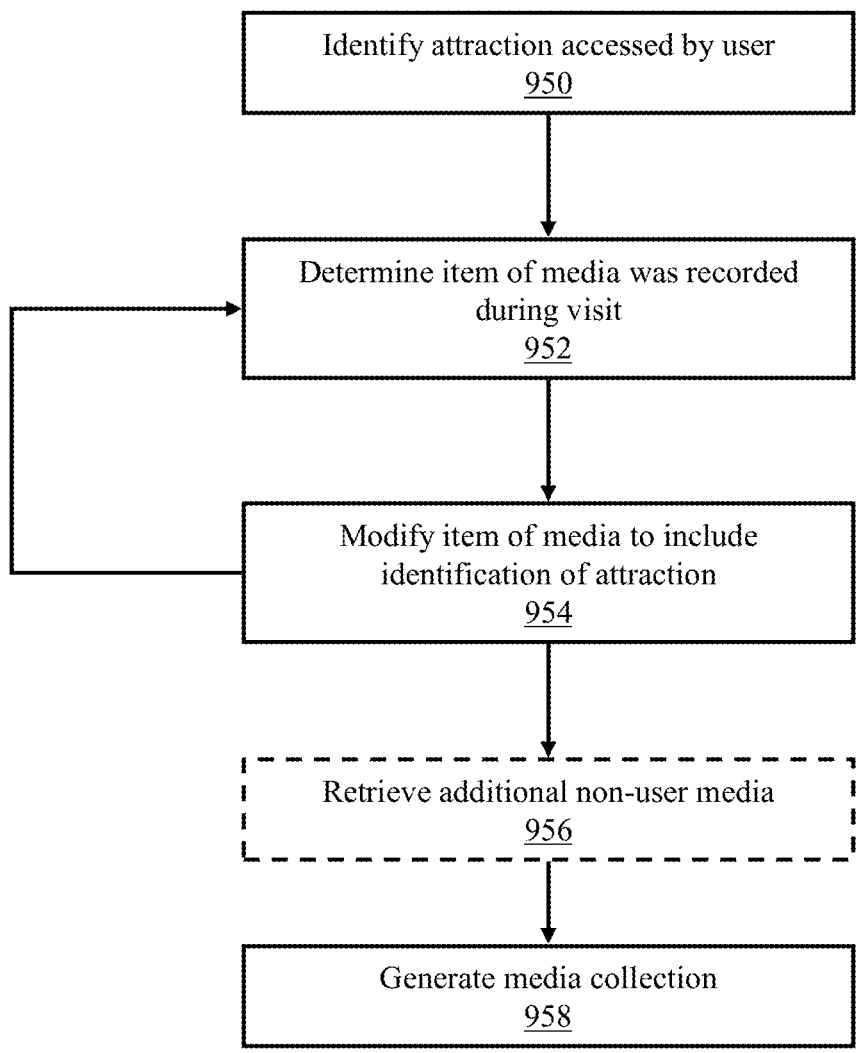
FIG. 9C is a flow chart of an embodiment of a method for automatically tagging and generating a user media album.

Referring briefly to FIG. 9C, illustrated is a flow chart of an embodiment of automatically generating a media collection representing a user's visit to an attraction. At step 950, a device, such as a computing device of the user or a computing device of a dynamic pricing system operator, may comprise a record generator, such as an application, service, server, routine, or other executable code configured for generating a trip history or record of the user's visits to attractions. In some embodiments, the record generator may identify an attraction accessed by the user, a user arrival time at the attraction, a user departure time from the attraction, and/or a user dwell time at the attraction. In one embodiment, the record generator may receive an indication of arrival and departure from the attraction, such as via an entry or departure gate, while in another embodiment, the record generator may receive an indication of arrival and departure based on a portable computing device of the user detecting a local signal, such as a WiFi signal of the attraction. For example, in one embodiment, an application on a smart phone of the user may monitor broadcast wireless Service Set Identifiers (SSIDs) and determine that a user is at an attraction, based on detecting an SSID maintained by the attraction. In another embodiment, the computing device may use GPS, cellular or WiFi location services to determine that the user is within the boundaries of an attraction.

At step 952, the record generator may determine that an item of media was recorded during the visit. In one embodiment, the record generator may compare a timestamp of the item of media, such as a photo, audio recording, or video recording, to the arrival and departure time or arrival time and dwell time. In another embodiment, the record generator may compare a location of recording of the item of media identified in a metatag or other identifier to a location of the attraction.

At step 954, the record generator may identify the item of media with the identification of the attraction. In some embodiments, the record generator may insert an identification of the attraction, such as a name, into a metatag of the item of media. In other embodiments, the record generator may include the item of media in an album identified by the attraction identification. In some embodiments, steps 952-954 may be performed dynamically as each item of media is recorded, or may be performed after recording a plurality of items of media and may be repeated iteratively for each item of media.

At step 956, optionally in some embodiments, the record generator may retrieve one or more additional items of media not recorded by the user, such as images, videos, or other recordings provided by the attraction operator. In some embodiments, the additional items of media may be pre-tagged with an identification of the attraction, while in other embodiments, the additional items of media may be modified by the record generator to be identified by the attraction identification, similar to the user-recorded items of media. For example, in one such embodiment, the additional items of media may be included in the album. At step 958, the record generator may generate a media collection, such as the album, a playlist of recordings, or other such collections, and may provide the collection to the user. Accordingly, the record generator may automatically create memorabilia or a record of a trip for a user, providing an inexpensive benefit.

G. Systems and Methods for Improved Ticket Purchase and Access

Many customers carry portable computing devices, such as Apple iOS-based smartphones and tablets such as the Apple iPhone and iPad, or Google Android-based smartphones and tablets such as the Motorola Xoom tablet, the Samsung Galaxy, or the HTC Sensation. With networking capabilities and cameras, these devices can be used for enhanced ticket purchase and access systems using built-in capabilities.

Figure 10A:
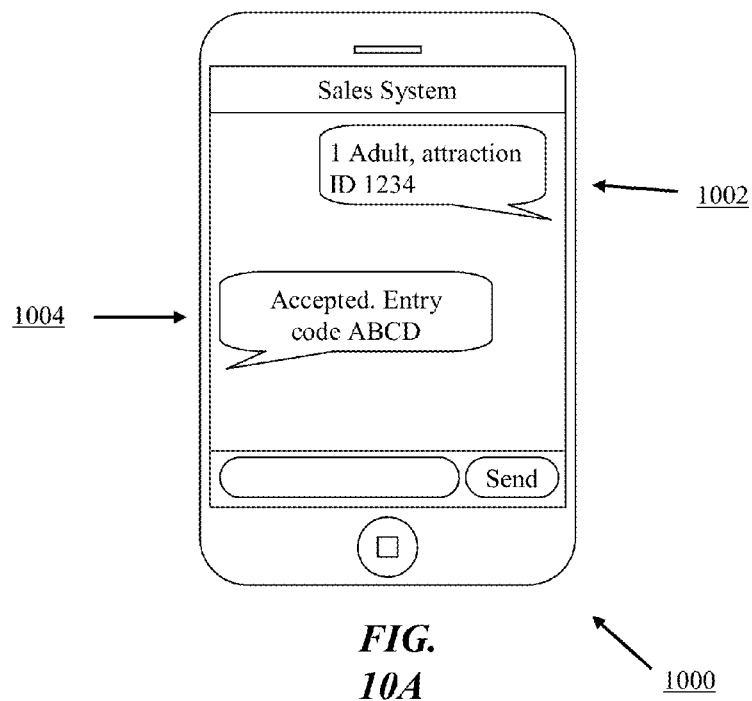
FIG. 10A is an illustration of an embodiment of a system for providing text-message-based ticketing.

For example, illustrated in FIG. 10A is an embodiment of a system for providing text-message-based ticketing. In brief overview, a smartphone 1000 may include the ability send text or SMS messages. In one embodiment, a customer may utilize smartphone 1000 to send a text message 1002 to the dynamic pricing system operator to purchase access to an attraction. The text message 1002 may comprise an identifier of a number of tickets, a ticket class or classes, and an attraction identifier. For example, a sign may be posted at the entrance to an attraction indicating that customers may send a text to a predetermined number with a predetermined code to purchase a ticket through their phone, without having to wait in line. The system may respond with a text message 1004 indicating the purchase request 1002 was accepted. In some embodiments, text message 1004 may include an access or entry code. In one such embodiment, the access or entry code may also be simultaneously provided to the attraction operator. When the customer requests access to the attraction and provides the entry code, the attraction operator may compare the customer's code to a list of received codes from the access system or dynamic pricing system operator. If the customer's code matches, then the customer may be granted entry and the code removed from the attraction operator's list. In some embodiments, the codes may be valid for a predetermined or limited amount of time, allowing re-use and shorter codes without significantly compromising access security. In one embodiment, the purchased ticket may be billed directly to the customer's phone bill, eliminating the need for providing credit card information over the phone.

Figure 10B:
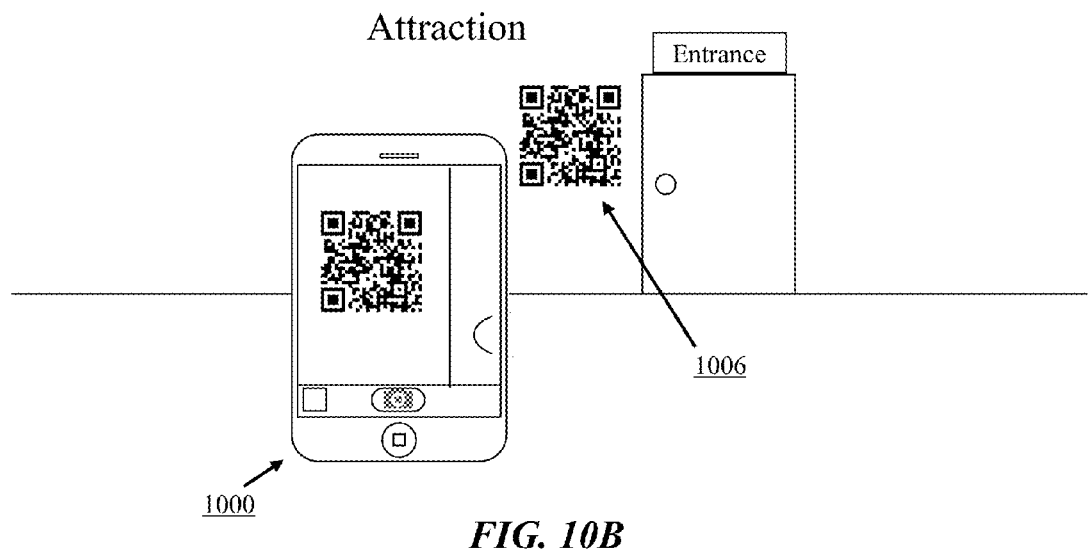
FIG. 10B is an illustration of an embodiment of a system for providing QR code-based ticketing.
Figure 10C:
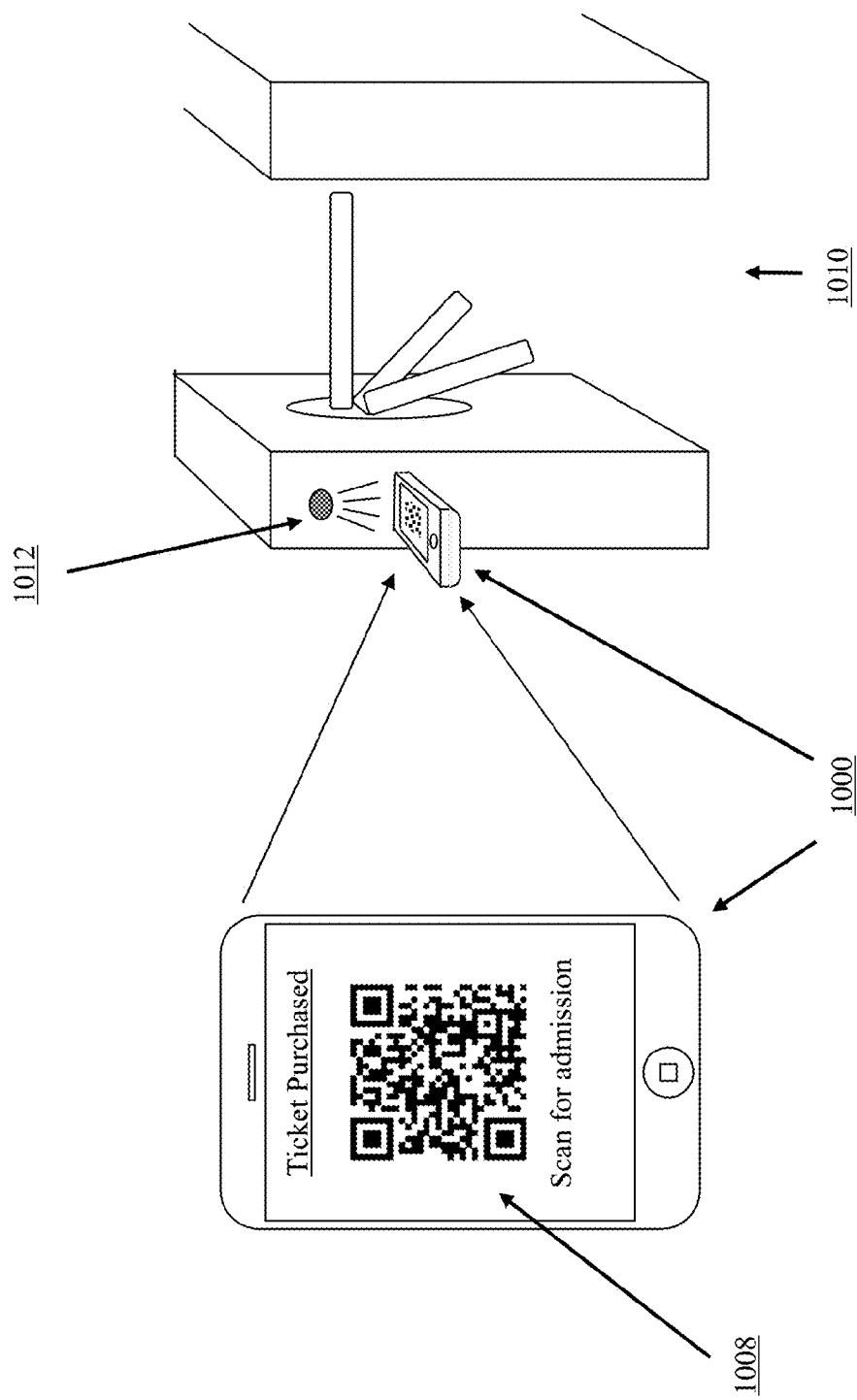
FIG. 10C is an illustration of another embodiment of a system for providing QR code-based ticketing.

In a similar concept, illustrated in FIGS. 10B and 10C are embodiments of a system for providing QR code-based ticketing and access. Although shown with QR codes, in many embodiments, bar codes, text or number codes, data codes, or other images may be utilized (referred to generally as code(s) 1006). In brief overview, a customer may use a smartphone 1000 incorporating a camera to take a picture of a QR code or other code 1006 provided by an attraction operator. The code 1006 may identify the attraction, a ticket price and/or class, or other information. Although only one code 1006 is shown, in many embodiments, a plurality of codes may be provided and customers may select a ticket class for purchase by taking a picture of one code 1006 of the plurality of codes 1006. In one embodiment, the customer may send the picture via a multimedia or MMS message to the system operator, while in another embodiment, the customer's smartphone may parse the code to identify a data string, which may be transmitted to the system operator.

As discussed above in connection with FIG. 10A, the system operator may provide an access code to the customer once purchase is confirmed. Referring briefly to FIG. 10C, in one such embodiment, the system operator may either provide a data code such as QR code 1008, or the customer's smartphone 1000 may parse an access code received from the system operator and generate a QR code 1008 or other data code. In some embodiments, the customer may show the received or generated code 1008 on the display of their smartphone 1000 to a scanner 1012 on an access gate 1010, such as an optical scanner on a turnstyle as shown. In other embodiments, the code may be shown on a customer's tablet or mobile computer, or the customer may print the code for scanning.

Although described above in terms of text or multimedia messaging, in many embodiments, the system operator may provide an application, such as a smartphone application, for download and use by the customer. This may be done to provide secure communications, such as through ssh or https communications between the smartphone application and the system operator, or to provide data code generation and parsing within the application. The application may also have a more efficient or friendly interface than requiring the customer to run a photo application to take a photo, use a messaging application to provide the message, and a third application for displaying a received code.

Additionally, although described above in terms of visible codes, in some embodiments, a mobile device may include a nearfield or local area wireless communication system, such as RFID or Bluetooth. In these embodiments, rather than capturing or displaying a code, the customer may simply move their mobile device in proximity to an attraction operator's transceiver to receive appropriate codes for ticket purchase, or provide access codes.

As discussed above, in some embodiments, the system need not include any terminals deployed at attraction locations. Purchases and access may be made through the customer's mobile device, and, in some embodiments, confirmation codes may be provided to an attraction operator's computing device, such as a point-of-sale terminal, desktop or laptop computer, or a mobile device of their own. This reduces system costs and aids flexibility. Furthermore, because attraction operators may not need custom terminals, an operator may join or enroll in the system on their own. For example, a vendor or attraction operator, wishing to have his or her attraction included in the system, may visit a web page or download a free application and provide details including ticket classes, times, retail prices, net prices, or other contract details as discussed above. The attraction may then be immediately made available to customers via the dynamic pricing engine or ticket extension systems discussed above, or tickets may be purchased as discussed above. This vendor self-enrollment system may be highly desirable for attraction operators who wish to try out the system, as the operators need incur no significant additional expenses to join.

Figure 10D:
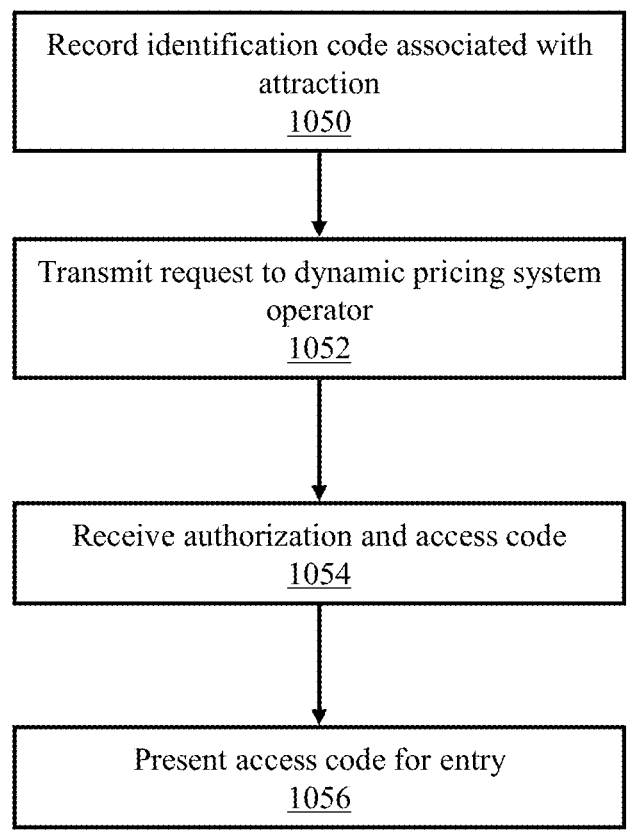
FIG. 10D is a flow chart of an embodiment of a method for providing improved access to an attraction via a computing device of a user.

Referring now to FIG. 10D, illustrated is a flow chart of an embodiment of a method for improved access to an attraction via a computing device of a user. In brief overview, at step 1050, a first computing device of a user may record an identification code associated with an attraction. At step 1052, the first computing device may transmit a request for access to the attraction to a second computing device of a dynamic pricing system operator. At step 1054, the first computing device may receive an access authorization comprising an access code from the second computing device, transmitted responsive to the request. At step 1056, the first computing device may present the access code for entry to the attraction.

Still referring to FIG. 10D and in more detail, at step 1050, a first computing device of a user, such as a smart phone or other computing device, may record an identification code associated with an attraction responsive to a command of the user. In one embodiment, the user may take a picture of a QR code, bar code, alphanumeric string, or other code at the attraction. In other embodiments, the user may enter an identification code via a keypad or similar device. In still other embodiments, the computing device may record a transmitted code responsive to a user command. For example, in one embodiment, the user may use the computing device to connect to a wireless network at the attraction. A web server at the attraction may provide an offer to purchase an access ticket, such as via a web page. The user may select to purchase the access ticket and may receive a purchase code, which may comprise the identification code. Identification codes may be specific to the attraction, or to an access ticket, such as an adult pass or child pass.

At step 1052, the first computing device may transmit a request for access to the attraction comprising the identification code to a second computing device of a dynamic pricing system operator, such as any of the systems or servers discussed above. In some embodiments, the first computing device may also transmit an identification of the user, and/or an identification of an account, access ticket, access token, or other identifier associated with the user. This may allow the user to easily add attractions to an existing ticket, as discussed above.

At step 1054, the first computing device may receive an access authorization comprising an access code from the second computing device, responsive to the user being granted access to the attraction. In some embodiments, the second computing device may add a purchase to a user account or existing ticket, and may charge the user's account or a credit card of the user. Upon a successful purchase, the second computing device may transmit the authorization and access code. In other embodiments, the second computing device may transmit a request to the user for a credit card number or account number, or other credentials such as a username and password. In still other embodiments, the second computing device may transmit an offer to purchase an access ticket to the first computing device. The user may select to accept the offer, and responsive to the user selection, the first computing device may transmit a response accepting the offer to the second computing device. This may allow for dynamic pricing of the attraction ticket, by allowing a user to select to purchase a ticket and receive an offer with a dynamically generated price as discussed above, including being based on previous purchases by the user. It also may provide a safety against accidental purchase by the user (e.g. taking a picture of a friend, with a QR code visible in the background of the image).

At step 1056, the access code may be presented by the first computing device to an attraction operator for access to the attraction. In some embodiments, the received access authorization may include an access code such as an alphanumeric string. In other embodiments, the access code may comprise an image, such as a QR code or barcode. In still other embodiments, the access code may comprise an image or code periodically changed. For example, a gate operator at an attraction may be notified of an image, changed periodically, that authorized consumers will display. This may result in the operator not being required to utilize a computing device, but rather simply look at computing devices of users and allow or deny them entry to the attraction. In a further embodiment, and to prevent fraud, the access code may comprise an incrementing code. The attraction operator need only look for increasing code values to allow entry. In other embodiments, the attraction operator may use another computing device, such as a smart phone or handheld scanner to scan or take a picture of an access code presented by a user and verify the code as an authorized code, as discussed above.

Thus, without requiring expensive additional equipment, a full dynamic pricing and access control system may be based on just computing devices of consumers and the attraction operator, such as smart phones, laptops, tablets, or other devices.

The systems and methods discussed herein may also be extended to membership systems, replacing the need for an attraction operator to maintain a separate membership purchase and access system. For example, many museums provide monthly or annual memberships, allowing a customer member to enter at any time, either fully prepaid when purchasing the membership, or with an initial prepayment and then heavily discounted tickets for each entry. These memberships may be directly integrated in the dynamic pricing engine and access control systems discussed herein, allowing attractions to provide memberships with needing to maintain a separate member database and access system.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed:

1. A method for improved access to an attraction via a computing device of a user, comprising:
   recording, by a first computing device of a user, an identification code associated with a first attraction;
   transmitting, by the first computing device to a second computing device, a request for access to the first attraction, the request comprising the identification code and an identification of a previously purchased ticket of the user, the ticket providing access to a second attraction in exchange for payment by the user of a first price calculated based on a first net price paid to an operator of the second attraction;
   receiving, by the first computing device from the second computing device, an offer to purchase an access ticket to the first attraction, the offer including a second price calculated based on the first price of the previously purchased ticket of the user and a sum of the first net price and a second net price to be paid to an operator of the first attraction;
   receiving, by the first computing device from the second computing device, an access authorization comprising an access code, responsive to the user accepting the offer; and
   presenting, by the first computing device, the access code to an attraction operator for access to the first attraction.

2. The method of claim 1, wherein recording the identification code comprises capturing an image of the identification code with a camera of the first computing device.

3. The method of claim 1, wherein recording the identification code comprises inputting an identification code, by the user.

4. The method of claim 1, wherein recording the identification code comprises recording a wirelessly transmitted code from a third computing device.

5. The method of claim 1, wherein receiving an access authorization further comprises receiving an access authorization responsive to successful billing of the user to a payment system.

6. The method of claim 1, wherein receiving the access authorization further comprises receiving an image.

7. The method of claim 1, wherein receiving the access authorization further comprises:
   receiving, by the first computing device, a selection of the user to accept the offer; and
   transmitting, by the first computing device to the second computing device, a response accepting the offer.

8. The method of claim 1, wherein presenting the access code further comprises presenting the access code for scanning by a fourth computing device of the attraction operator.

9. The method of claim 1, wherein the previously purchased ticket was purchased without an identification of the first attraction.

10. The method of claim 1, wherein transmitting the request for access to the first attraction further comprises transmitting an identification of a requested ticket class; and wherein the offer price is further based on the requested ticket class.

11. The method of claim 1, wherein the previously purchased ticket was provided responsive to a request of the user for access to the second attraction, and wherein the offer price is further based on a sum of a retail price for the first attraction and a retail price for the second attraction, minus the sum of the first net price and the second net price.

12. The method of claim 1, wherein the access code is provided to the attraction operator by the second computing device; and wherein presenting the access code to the attraction operator further comprises presenting the access code for comparison to the access code provided to the attraction operator.

13. The method of claim 4, further comprising receiving, by the first computing device, the wirelessly transmitted code broadcast by the third computing device.

14. A system for improved access to an attraction via a computing device of a user, comprising:
   a first computing device of a user comprising:
   an input device for recording an identification code associated with a first attraction;
   a network interface for transmitting, to a second computing device, a request for access to the first attraction, the request comprising the identification code and an identification of a previously purchased ticket of the user providing access to a second attraction in exchange for payment of a first price by the user, and receiving, from the second computing device, an access authorization comprising an access code, responsive to the second computing device successfully billing the user via a payment system with an amount based on the first price of the previously purchased ticket, and a sum of a first net price due to the operator of the second attraction and a second net price due to the operator of the first attraction; and a display for presenting the access code to an attraction operator for access to the first attraction.

15. The system of claim 14, wherein the input device comprises a camera and is configured for capturing an image of the identification code.

16. The system of claim 14, wherein the input device is configured for receiving an identification code input by the user.

17. The system of claim 14, wherein the input device records a wirelessly transmitted code from a third computing device.

18. The system of claim 14, wherein the network interface receives the access authorization comprising an image.

19. The system of claim 14, wherein the network interface receives, from the second computing device, an offer to purchase an access ticket to the attraction; and transmits, to the second computing device, a response accepting the offer, responsive to a user selection.

20. A method for improved access to an attraction, comprising:

receiving, by a server from a remote computing device of a user, request for access to a first attraction comprising an identification code associated with the first attraction;

retrieving, by the server, an identification of a previously purchased ticket of the user for access to a second attraction;

calculating, by the server, a first margin based on a difference between a sum of a first retail price for access to the first attraction and a second retail price for access to the second attraction, and a sum of a first net price to be paid to the operator of the first attraction and a second net price to be paid to the operator of the second attraction;

determining, by the server, that the first margin exceeds a predetermined threshold;

calculating, by the server responsive to the determination, a first adjustment equal to the sum of the first net price and the second net price, multiplied by the first margin minus the predetermined threshold;

transmitting, by the server to the remote computing device, an offer to purchase access to the first attraction, comprising a third retail price equal to the first retail price minus the first adjustment; and transmitting, by the server to the remote computing device, an access code, responsive to receipt of an offer acceptance from the remote computing device.

\* \* \* \* \*